(12) United States Patent
Otsu

(10) Patent No.: US 6,260,644 B1
(45) Date of Patent: Jul. 17, 2001

(54) MOTOR CONTROLLING APPARATUS FOR A HYBRID CAR

(75) Inventor: Atsushi Otsu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/152,110

(22) Filed: Sep. 14, 1998

(30) Foreign Application Priority Data

Sep. 14, 1997 (JP) .................................................. 9-268082
Mar. 17, 1998 (JP) ................................................ 10-067383

(51) Int. Cl.⁷ .................................................. B60K 6/02
(52) U.S. Cl. ........................................ 180/65.3; 180/165
(58) Field of Search .................................. 180/65.1, 65.2, 180/65.3, 65.4, 165; 701/22, 70; 318/139, 590, 591, 255, 268

(56) References Cited

U.S. PATENT DOCUMENTS

| | | | |
|---|---|---|---|
| 4,335,429 | * 6/1982 | Kawakatsu | 180/65.2 |
| 4,407,132 | * 10/1983 | Kawakatsu et al. | 180/65.4 |
| 4,855,652 | * 8/1989 | Yamashita et al. | 318/268 |
| 5,357,181 | * 10/1994 | Mutoh et al. | 318/139 |
| 5,412,294 | * 5/1995 | Anzai | 318/139 |
| 5,446,351 | * 8/1995 | Kusano et al. | 701/22 |
| 5,467,275 | * 11/1995 | Takamoto et al. | 701/70 |
| 5,576,960 | * 11/1996 | Maeda | 701/70 |
| 5,589,743 | * 12/1996 | King | 180/65.4 |
| 5,786,640 | * 7/1998 | Sakai et al. | 180/65.2 |
| 5,898,282 | * 4/1999 | Drozdz et al. | 180/65.4 |

FOREIGN PATENT DOCUMENTS

| | | | |
|---|---|---|---|
| 2006801 | * 8/1971 | (DE) | 180/65.4 |
| 0536569A2 | 4/1993 | (EP) . | |
| 0724979A1 | 7/1996 | (EP) . | |
| 62-27604 | 6/1987 | (JP) . | |
| 91/08122 | * 6/1991 | (WO) | 180/65.2 |

OTHER PUBLICATIONS

Japanese Abstract: JPA56–145702, Nov. 11, 1987.

* cited by examiner

*Primary Examiner*—Frank Vanaman
(74) *Attorney, Agent, or Firm*—Birch, Stewart, Kolasch & Birch, LLP

(57) ABSTRACT

A motor controlling apparatus for a hybrid car can effect current feedback control by which motor current can be controlled with a high degree of accuracy when a generator-motor rotates at a low speed to protect the generator-motor from over-current. The motor controlling apparatus can also effect torque feedback control in a high vehicle speed and high torque region to raise the fuel consumption efficiency of an engine.

18 Claims, 31 Drawing Sheets

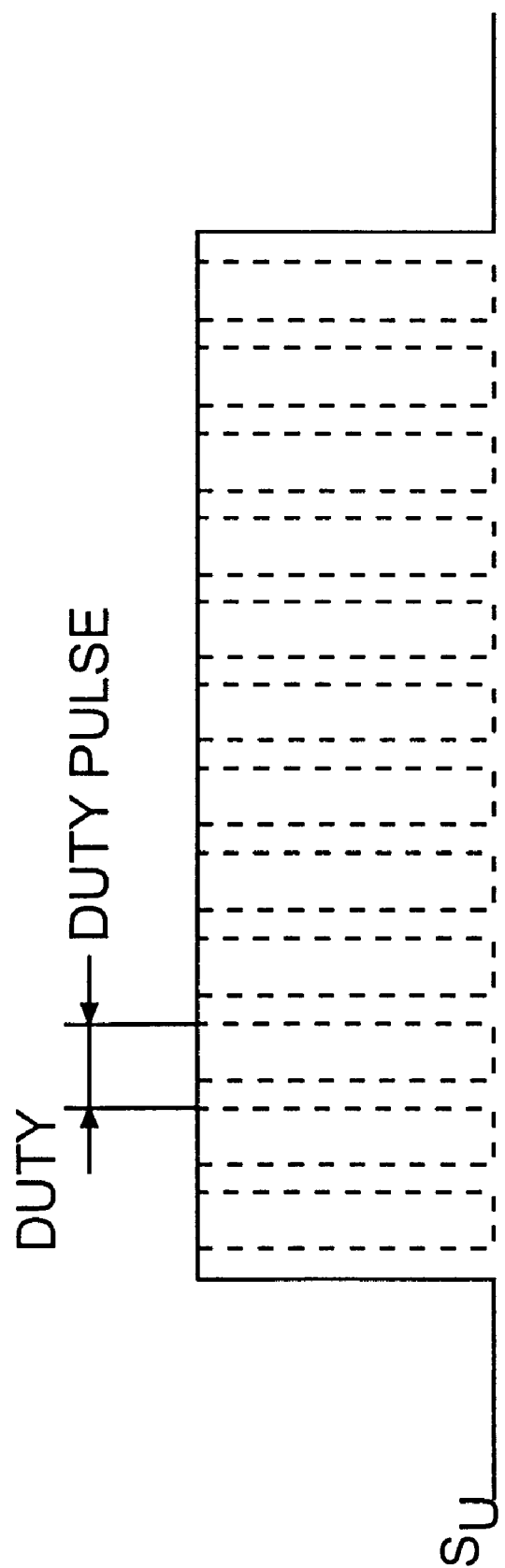

MOTOR CONTROLLING APPARATUS FOR A HYBRID CAR

BACKGROUND OF THE INVENTION

1. Field of the Invention

This invention relates to a hybrid automobile provided with an internal combustion engine and electric motor.

2. Description of the Relevant Art

For an engine carried on an automobile or the like, torque and revolution number (RPM) characteristics over a wide range are required so that the engine may operate in any running condition (constant speed, acceleration, uphill road driving and so forth). Generally, the torque and the RPM's of the engine in which the fuel consumption efficiency is high are specified to a range peculiar to the engine. Therefore, there has been proposed a hybrid car including both an engine and a generator-motor so that the drawbacks of one of the power sources may be made up for by the benefits of the other power source under various conditions. Therefore, the overall energy efficiency of the car is improved.

In a conventional hybrid car, the engine is designed with a reduced capacity and is normally operated only in a range in which it exhibits a high fuel consumption efficiency. A motor controlling apparatus for a hybrid car is provided which effects regenerative control such that, when the car is accelerated or runs on an uphill road or the like, driving of the generator-motor is controlled with supplied power from a power supply such as a battery to make up for an insufficient driving torque. When the output of the engine exhibits some surplus power, generated energy, obtained when the generator-motor is driven by the engine, is regenerated into the power supply such as a battery (see the official gazette of Japanese Patent Publication Application No. 62-27604).

The conventional motor controlling apparatus for a hybrid car causes motor current to flow through the generator-motor and controls the generator-motor so that an aimed torque, calculated based on an operation amount of an accelerator pedal or the like, and a fed back driving wheel torque, detected by a torque sensor or the like, may be equal to each other to make up for an insufficient driving torque.

However, with the conventional motor controlling apparatus for a hybrid car, since the torque of the driving wheel, detected using a torque detection mechanism which has some range of mechanical dispersion, is fed back to cause motor current to flow though the generator-motor to make up for an insufficient driving torque, particularly when a high torque is requested while the speed of revolution is low, excessive motor current sometimes flows within the range of the dispersion. The excessive motor current may exceed a rated motor current and possibly damage the generator-motor and reduce its life. In order to prevent damage to the generator-motor, a generator-motor having a high rated motor current, taking an excessive motor current when a high torque is requested during low speed revolution, must be employed. Such a generator-motor has an increased size.

SUMMARY OF THE INVENTION

The present invention has been made to solve one or more of the drawbacks of the prior art described above.

The present invention provides a motor controlling apparatus for a hybrid car which can effect current feedback control, by which motor current can be controlled with a high degree of accuracy, when a generator-motor rotates at a low speed, in order to protect the generator-motor from over-currents, and which motor controlling apparatus can also effect torque feedback control in a high vehicle speed-high, torque region to raise the fuel consumption efficiency of an engine.

Accordingly, it is an object of the present invention to provide a motor controlling apparatus for a hybrid car comprising: a current feedback control means for controlling a generator-motor so that a motor current of the generator-motor may be equal to an aimed current set based on the torque instruction value; torque feedback control means for controlling the generator-motor so that a driving wheel torque which is a torque of a driving wheel detected by a torque sensor unit may be equal to the torque instruction value; and motor control means for selecting one of an output from the current feedback control means and an output from the torque feedback control means based on an output from a motor revolution number sensor, which detects a number of revolutions of the generator-motor and controlling the generator-motor, based on the selected one output.

Since the motor controlling apparatus for a hybrid car comprises the current feedback control means, the torque feedback control means, and the motor control means for controlling the generator-motor, when the generator-motor rotates at a low speed, current feedback control by which the motor current can be controlled with a high degree of accuracy can be performed to protect the generator-motor from over-current. On the other hand, in a high vehicle speed-high torque region, torque feedback control can be performed to effect control of the generator-motor including also the driving torque of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 29 is a waveform diagram of a duty pulse.

DETAILED DESCRIPTION OF THE INVENTION

An embodiment of the present invention is described below with reference to the accompanying drawings. It is to be noted that the drawings should each be viewed in the direction of the reference symbols.

Figure 1:
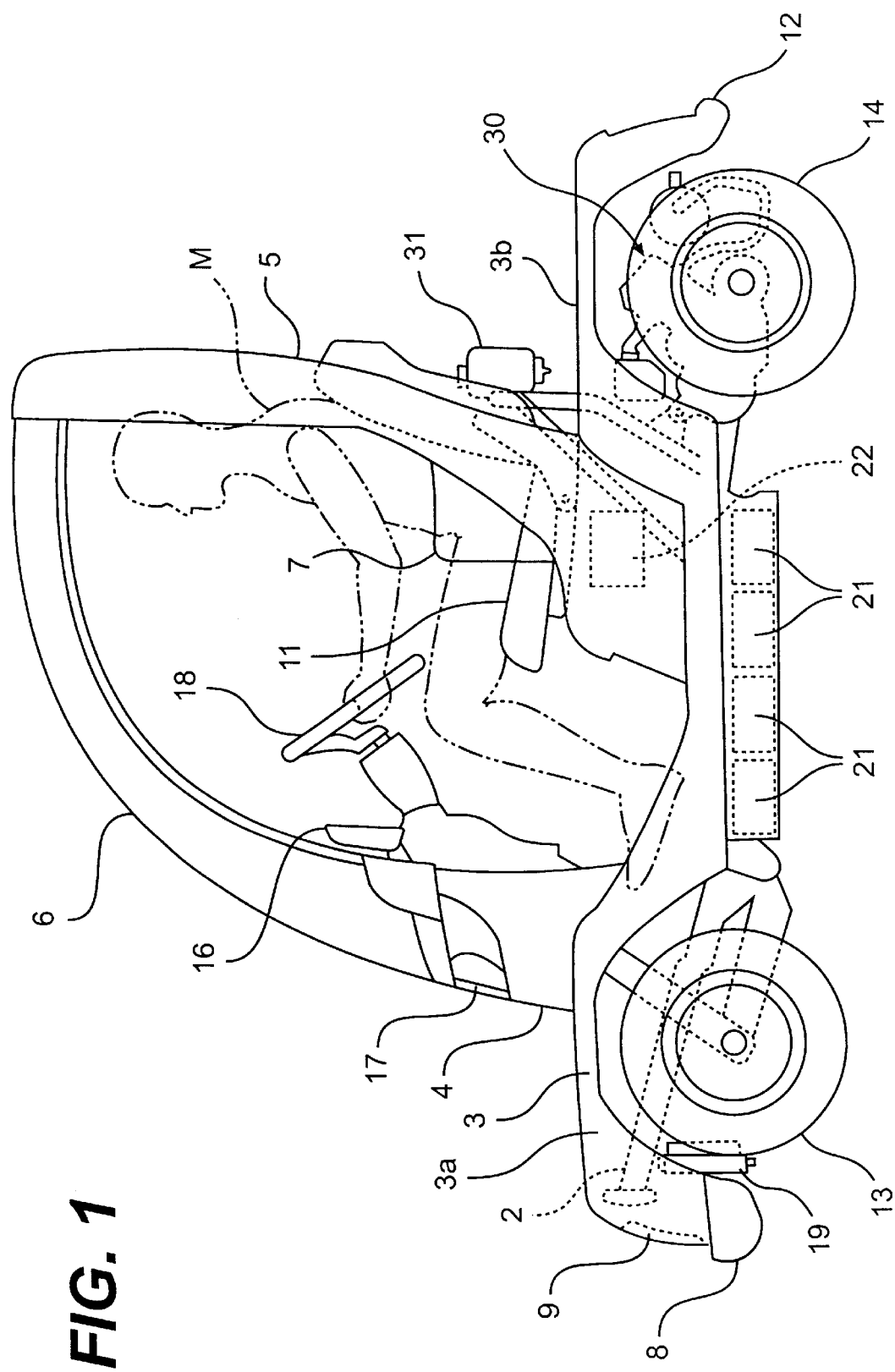
FIG. 1 is a side elevational view of a hybrid car, according to the present invention.

FIG. 1 is a side elevational view of a hybrid car according to the present invention. The hybrid car 1 includes a body frame 2, a body 3 mounted on the body frame 2, a front cover 4 extending upwardly from a front portion of a central portion of the body 3, a center pillar 5 extending upwardly from a rear portion of a central portion of the body 3, a transparent roof 6 extending from an end of the center pillar 5 to the front cover 4, side protectors 7, 7 mounted on the opposite sides of the center pillar 5, a front bumper 8 provided on a front face of the body 3, a radiator grill 9 provided immediately rearwardly of the front bumper 8, a driver's seat 11 mounted in the inside of the center of the body 3, a rear bumper 12 provided at a rear portion of the body 3, front wheels 13, 13 mounted on the body frame 2, rear wheels 14, 14 as driving wheels mounted on the body frame 2, side mirrors 16, 16 provided on the opposite sides of the transparent roof 6, lamps 17, 17 provided on the opposite sides of the front cover 4, a steering wheel 18 provided at the center of the body 3, a radiator 19 mounted rearwardly of the radiator grill 9, batteries 21 mounted at a central portion of the body frame 2, a control unit 22 disposed below the driver's seat 11, and a driving system unit 30 carried at a rear portion of the body frame 2. Reference symbol M denotes driver.

It is to be noted that reference symbol 3a denotes a front deck portion and 3b denotes a rear deck portion and a person can ride on the deck portions 3a, 3b and can enter to the driver's seat 11 readily from forwardly and from rearwardly through the deck portions 3a, 3b.

Figure 2:
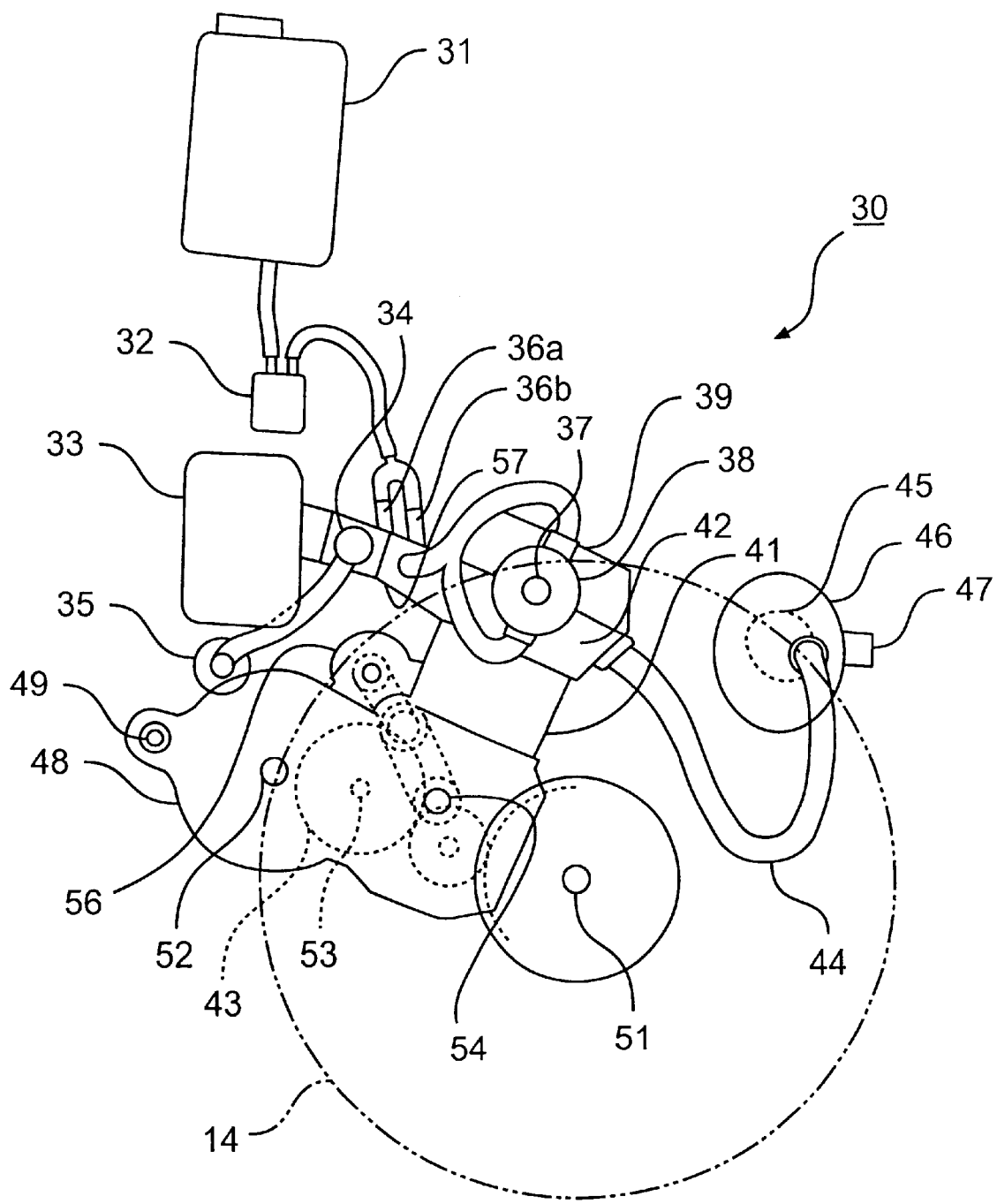
FIG. 2 is a side elevational view of a driving system unit of the hybrid car.

FIG. 2 is a side elevational view of the driving system unit of the hybrid car according to the present invention and shows principal components of the driving system unit 30. In particular, reference symbol 31 denotes a fuel tank, 32 a fuel pump, 33 an air cleaner, 34 a throttle pulley, 35 a servo motor, 36a an additional supplying injector, 36b a main injector, 37 a camshaft, 38 a mechanical pump which rotates integrally with the cam shaft 37, 39 a head cover, 41 a cylinder block, 42 a cylinder head, 43 a three-phase brushless motor as a generator-motor, 44 an exhaust pipe, 45 a metal catalyzer, 46 a muffler, 47 a tail pipe, 48 a cone-type non-stage transmission as a transmission, 49 a pivot shaft, 51 a rear axle, 52 a non-stage transmission shaft, 53 a motor shaft as a driving force joining point, 54 a crankshaft, 56 a sel-motor, and 57 an intake manifold.

Figure 3:
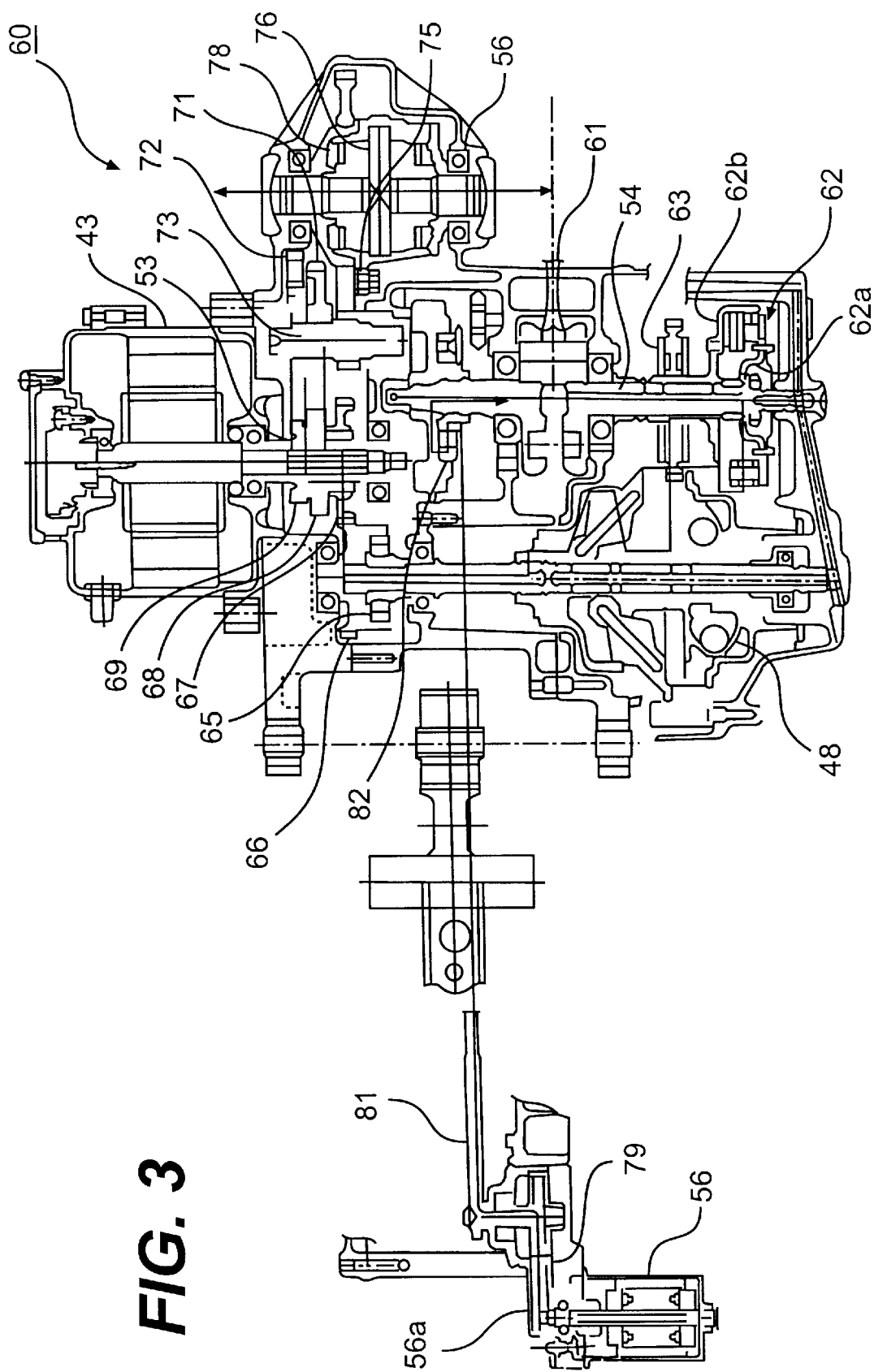
FIG. 3 is a side elevational view of a driving force transmission apparatus of the hybrid car.

FIG. 3 is a sectional view of a driving force transmission apparatus of the hybrid car according to the present invention. The driving force transmission apparatus 60 of the hybrid car 1 includes an engine 61, an inner member 62a of a centrifugal clutch 62 mounted on the crankshaft 54 of the engine 61, an outer member 62b of the centrifugal clutch 62 with and from which the inner member 62a is engaged and disengaged, the cone-type non-stage transmission 48 connected to the outer member 62b through a torque limiter 63, a first transmission gear 66 connected to the cone-type non-stage transmission 48 through a one-way clutch 65, the motor 43 for driving the hybrid car 1 together with the engine 61, the motor shaft 53 which serves as a joining point of driving forces, a second transmission gear 67 mounted on the motor shaft 53 and held in meshing engagement with the first transmission gear 66, an engine side first helical gear 68 and a motor side first helical gear 69 mounted on the motor shaft 53, an engine side second helical gear 71 and a motor side second helical gear 72 held in meshing engagement with the gears 68, 69, respectively, a countershaft 73 for supporting the gears 71, 72, pressure sensors 74a, 74b (refer to FIG. 8) mounted at the opposite ends of the countershaft 73, an output gear 75 mounted on the countershaft 73, a propeller shaft 76 connected to the output gear 75, the rear axle 51 connected to the propeller shaft 76 through a differential gear 78, and the rear wheels 14 (refer to FIG. 1) mounted on the rear axle 51. The sel-motor 56 rotates the crankshaft 54 connected to a motor shaft 56a thereof through a belt 79, a chain 81 and a one-way clutch 82.

Figure 4:
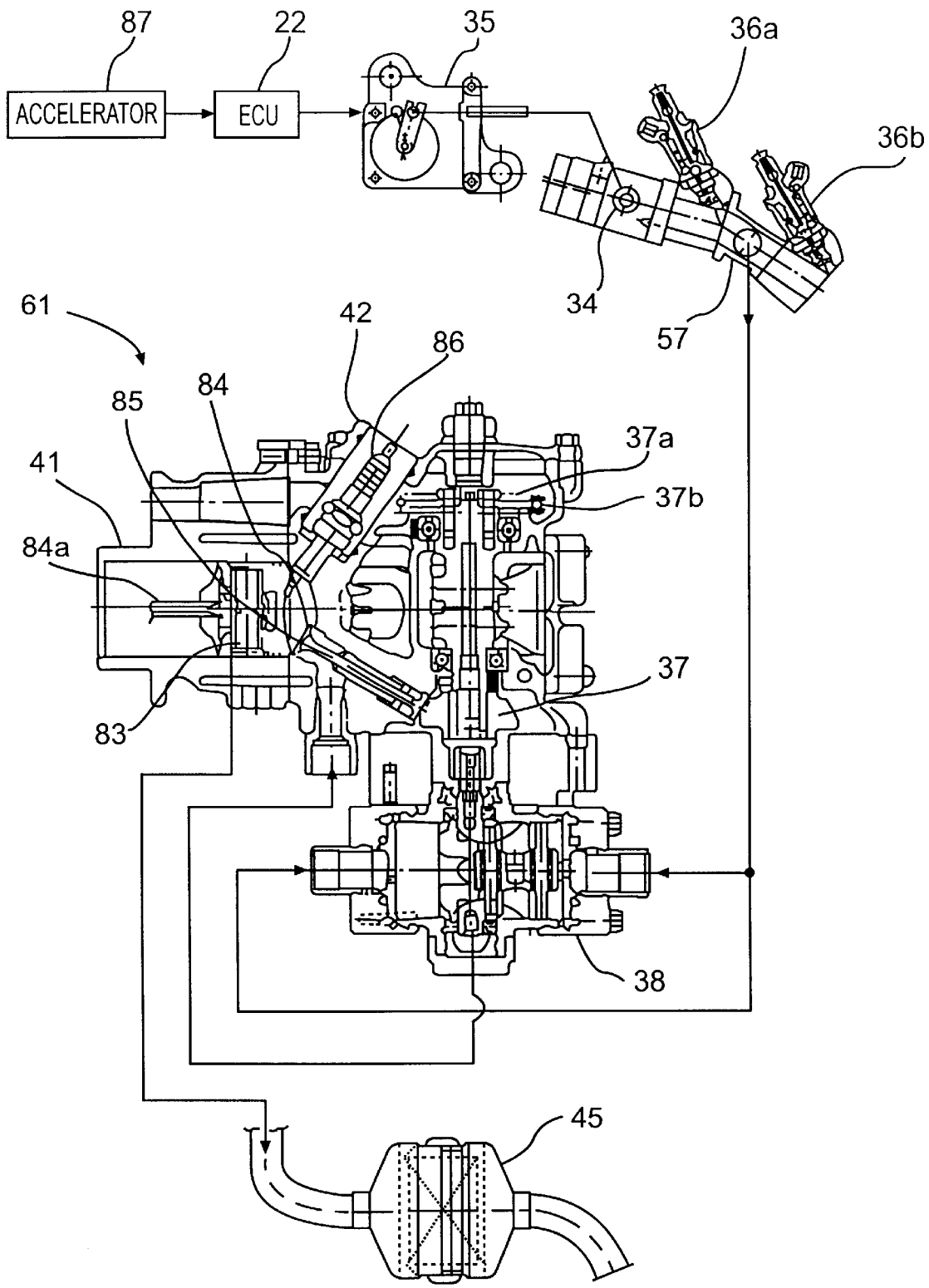
FIG. 4 is a sectional view of an engine of the hybrid car.

FIG. 4 is a sectional view of the engine of the hybrid car according to the present invention. The engine 61 includes the cylinder block 41, a piston 83 fitted for back and forth cylinder block 41, a connecting rod 83 is mounted, the cylinder head. 42 movement in the 84a on which the piston fitted on the cylinder block 41, an intake auxiliary valve 84 and an exhaust valve 85 provided on the cylinder head 42, and a spark plug 86 mounted on the cylinder head 42, and includes the mechanical pump 38 which rotates coaxially with the camshaft 37. It is to be noted that reference symbol 37a denotes a cam chain, and 37b denotes a cam sprocket wheel.

By adjusting the throttle pulley 34 through the control unit 22 and the servo motor 35 by an opening of an accelerator 87, the supply amount of fuel air mixture is adjusted to control the output power of the engine 61. During running only with the motor, if a request for the engine output power is issued when the accelerator 87 is open, the throttle pulley 34 is tightened by the servo motor 35 irrespective of the accelerator opening to make the starting of the engine 61 better. Meanwhile, part of the fuel air mixture, supplied from the injector 36a, is branched from the intake manifold 57 and additionally supplied by the mechanical pump 38 so as to be injected into the cylinder block 41 from the intake auxiliary valve 84 immediately prior to ignition to augment the engine output power.

Figure 5A:
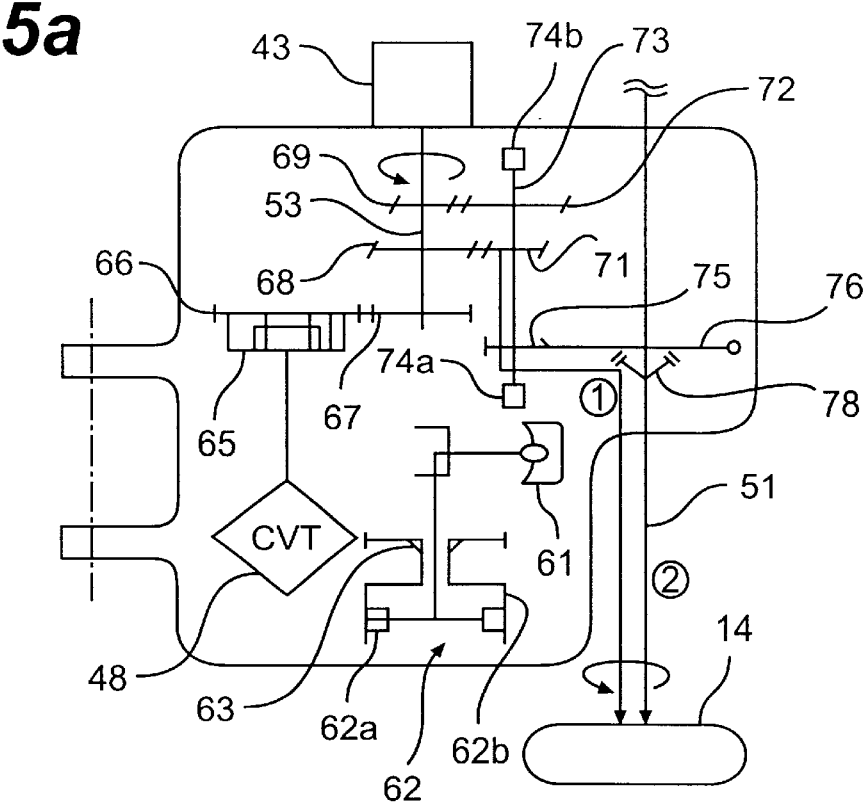
FIG. 5 is a diagram illustrating a first operation of the driving force transmission apparatus.
Figure 5B:
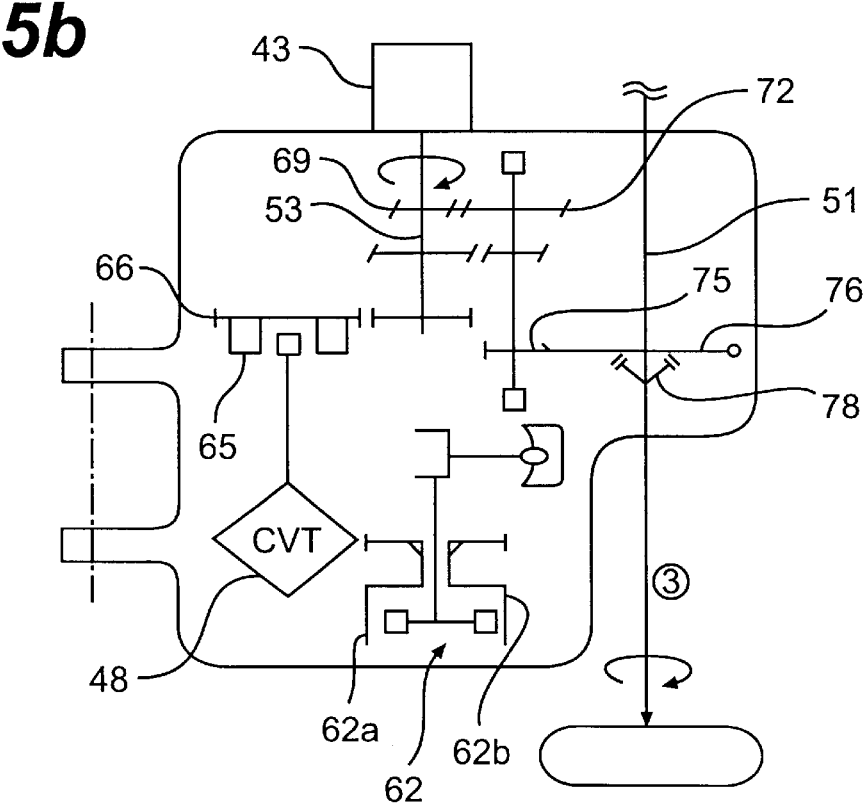

Operation of the driving force transmission apparatus 60 of the hybrid car 1 described above is described with reference to FIGS. 5(a), 5(b), 6(a), 6(b), and 7. FIGS. 5(a) and 5(b) are diagrammatic views of a first operation of the driving force transmission apparatus according to the present invention. FIG. 5(a) illustrates a case wherein the rear wheels 14 are driven by a joined force of the engine 61 and the motor 43. The engine 61 drives the rear wheels 14 through the inner member 62a of the centrifugal clutch 62, outer member 62b, cone-type non-stage transmission 48, one-way clutch 65, first transmission gear 66, second transmission gear 67 and engine side first helical gear 68 mounted on the motor shaft 53 which makes a joining point with the driving force of the motor 43, engine side second helical gear 71, output gear 75, propeller shaft 76, differential gear 78 and rear axle 51 in this order as indicated by an arrow labeled ①.

The motor 43 drives the rear wheels 14 through the motor shaft 53, motor side first helical gears 69, motor side second helical gear 72, output gear 75, propeller shaft 76, differential gear 78 and rear axle 51 in this order as indicated by an arrow labeled ②. The driving force of the engine 61 and the driving force of the motor 43 are joined together at the motor shaft 53.

When the hybrid car 1 is to be started with the engine 61, the torque can be transmitted gradually and smoothly through the centrifugal clutch 62 to start the hybrid car 1. Since the centrifugal clutch 62 is disposed in a stage preceding to the cone-type non-stage transmission 48, it may have a smaller clutch capacity than where it is disposed in a stage next to the cone-type non-stage transmission 48. On the contrary, as viewed from the cone-type non-stage transmission 48 side, since it need not receive an excessive torque of the engine 61 directly, also protection of the cone-type non-stage transmission 48 can be anticipated. Particularly where the clutch employed is of the wet type, since the contacting pressure is reduced, if the centrifugal clutch 62 is disposed in a stage following the cone-type nonstage transmission 48, then a large clutch capacity is required and the apparatus becomes large in size. Since the cone-type non-stage transmission 48 is connected to the outer member 62b of the centrifugal clutch 62 through the torque limiter 63, the engine 61 need not receive back torque from the rear wheels 14.

FIG. 5(b) illustrates a case wherein the rear wheels 14 are driven only with the motor 43. The motor 43 drives the rear wheels 14 through the motor shaft 53, motor side first helical gear 69, motor side second helical gear 72, output gear 75, propeller shaft 76, differential gear 78, and rear axle 51 as indicated by an arrow labeled ③. Since the engine 61 is stopped, the one-way clutch 65 is put into an open condition. Since the one-way clutch 65 is disposed immediately prior to the joining point with the driving force of the motor 43, when the rear wheels 14 are driven only with the motor 43, the cone-type non-stage transmission 48, the outer member 62b, of the centrifugal clutch 62 and so forth which serve as the load side are not rotated together at all. Accordingly, the consumption of the batteries 21 can be saved, and a longer operation time can be secured.

Figure 6A:
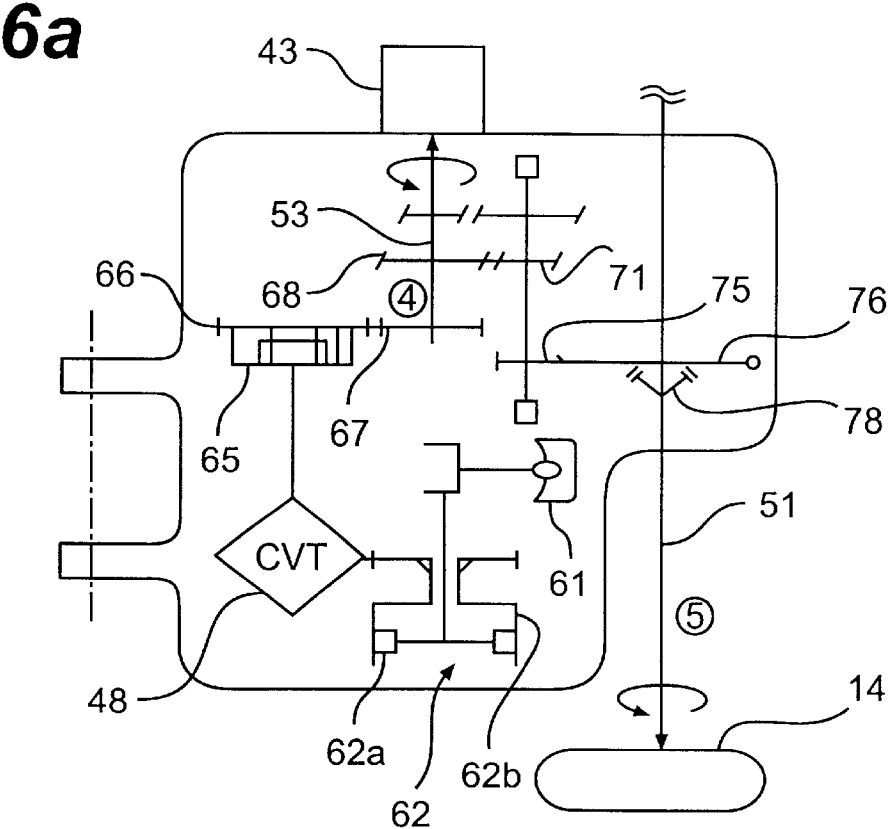
FIG. 6 is a diagram illustrating a second operation of the driving force transmission apparatus.
Figure 6B:
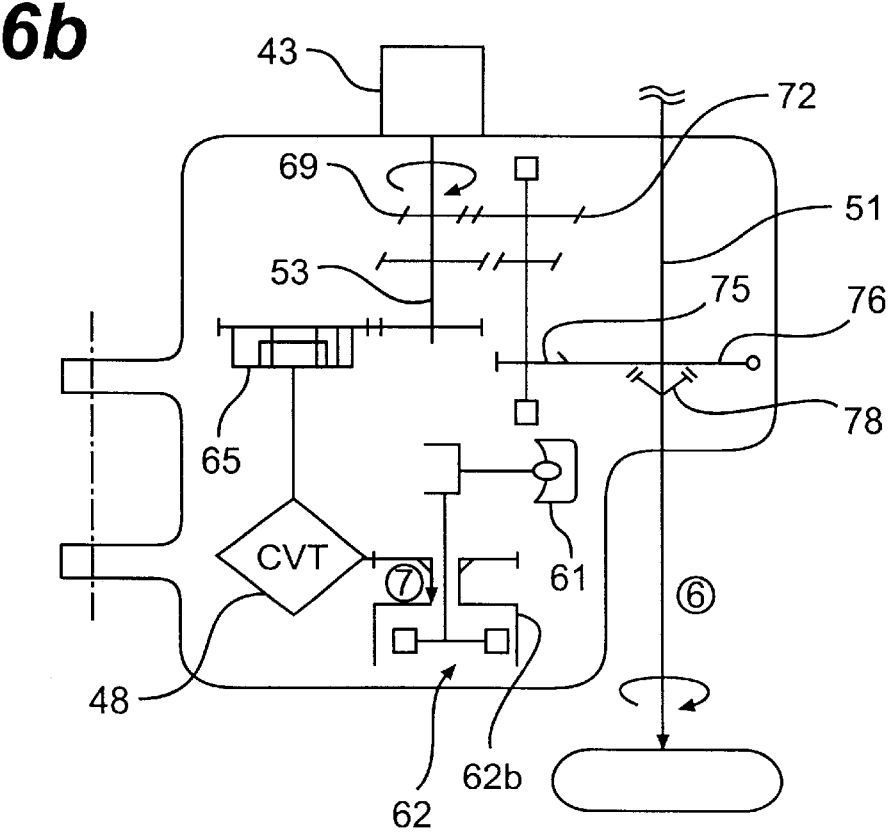

FIGS. 6(a) and 6(b) are diagrammatic views of a second operation of the driving power transmission apparatus according to the present invention. FIG. 6(a) illustrates a case wherein the rear wheels 14 are driven only with the engine 61. The engine 61 drives the motor shaft 53 through the inner member 62a of the centrifugal clutch 62, outer member 62b, cone-type non-stage transmission 48, one-way clutch 65, first transmission gear 66, and second transmission gear 67 in this order as indicated by an arrow labeled ④. In other words, the motor 43 can act as a generator to charge the batteries 21.

Further, the engine 61 drives the rear wheels 14 through the engine side first helical gear 68, the engine side second helical gear 71, output gear 75, propeller shaft 76, differential gear 78, and rear axle 51 in this order as indicated by an arrow labeled ⑤.

FIG. 6(b) illustrates a case wherein the hybrid car 1 is reversely driven to run backwardly by the motor 43. The motor 43 is driven to rotate reversely and the reverse rotation is transmitted to the rear wheels 14 through the motor shaft 53, motor side first helical gear 69, motor side second helical gear 72, output gear 75, propeller shaft 76, differential gear 78, and rear axle 51 in this order, as indicated by an arrow labeled ⑥ to reversely rotate the rear wheels 14. Since the motor 43 rotates reversely while the engine 61 is stopped, the one-way clutch 65 is connected and the driving force of the motor 43 is transmitted up to the cone-type non-stage transmission 48 and the outer member 62b of the centrifugal clutch 62 as indicated by an arrow labeled ⑦, but the engine 61 is not rotated together due to the presence of the centrifugal clutch 62.

Figure 7:
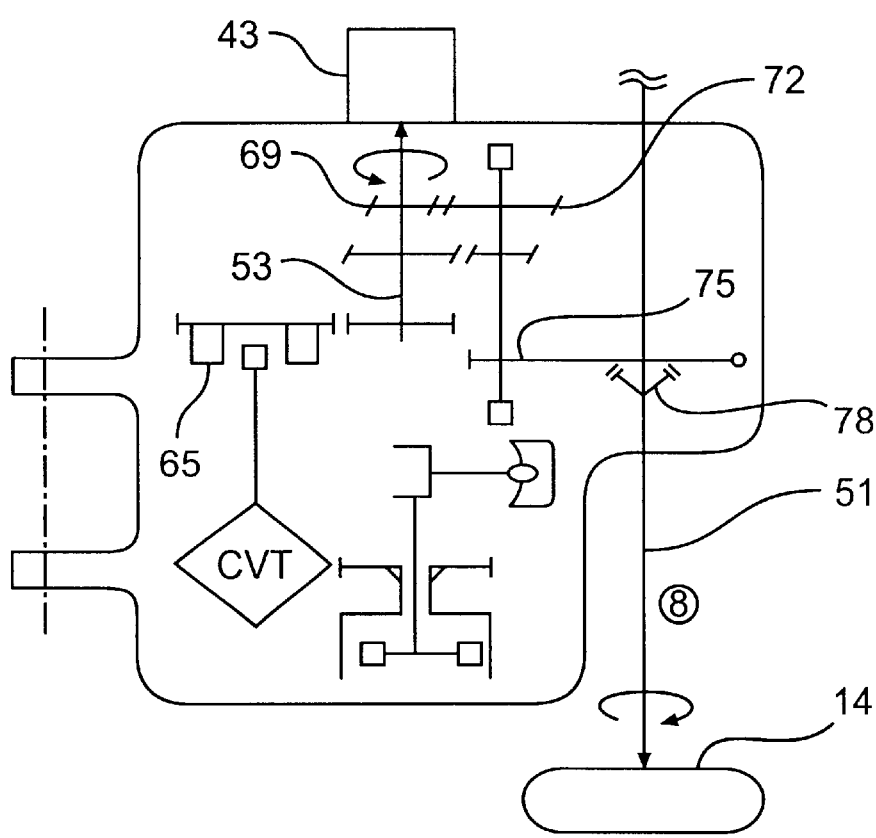
FIG. 7 is a diagram illustrating a third operation of the driving force transmission apparatus.

FIG. 7 is a diagrammatic view illustrating a third operation of the driving power transmission apparatus according to the present invention, and illustrates a flow of driving force upon deceleration of the hybrid car 1. Upon deceleration of the hybrid car 1, driving force is transmitted to the motor 43 through the rear wheels 14, rear axle 51, differential gear 78, propeller shaft 76, motor side second helical gear 72, motor side first helical gear 69, and motor shaft 53 in this order as indicated by an arrow labeled ⑧, and the motor 43 acts as a generator. In this instance, since the one-way clutch 65 is put into an open condition, the driving force upon deceleration can be transmitted effectively to the motor 43 and the batteries 21 can be charged.

Figure 8:
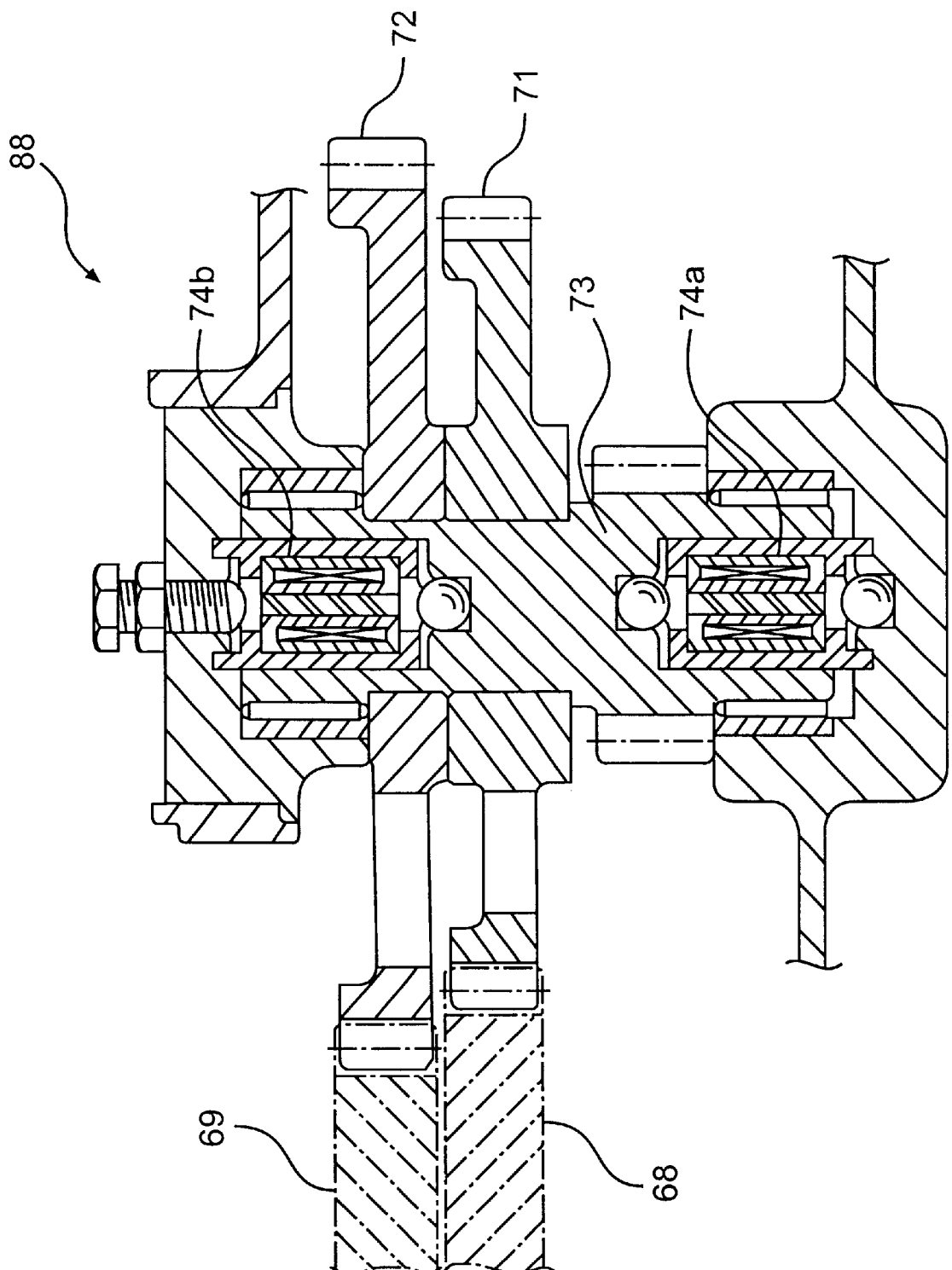
FIG. 8 is a sectional view of a torque sensor unit of the driving force transmission apparatus.

FIG. 8 is a sectional view of the torque sensor unit of the driving force transmission apparatus according to the present invention. The torque sensor unit 88 includes the countershaft 73, the pressure sensors 74a, 74b mounted at the opposite ends of the countershaft 73, the engine side second helical gear 71 and the motor side second helical gear 72 mounted on the countershaft 73, and the engine side first helical gear 68 and the motor side first helical gear 69 held in meshing engagement with the gears 71, 72, respectively.

An operation of the torque sensor unit 88 is described below with the following figure.

Figure 9A:
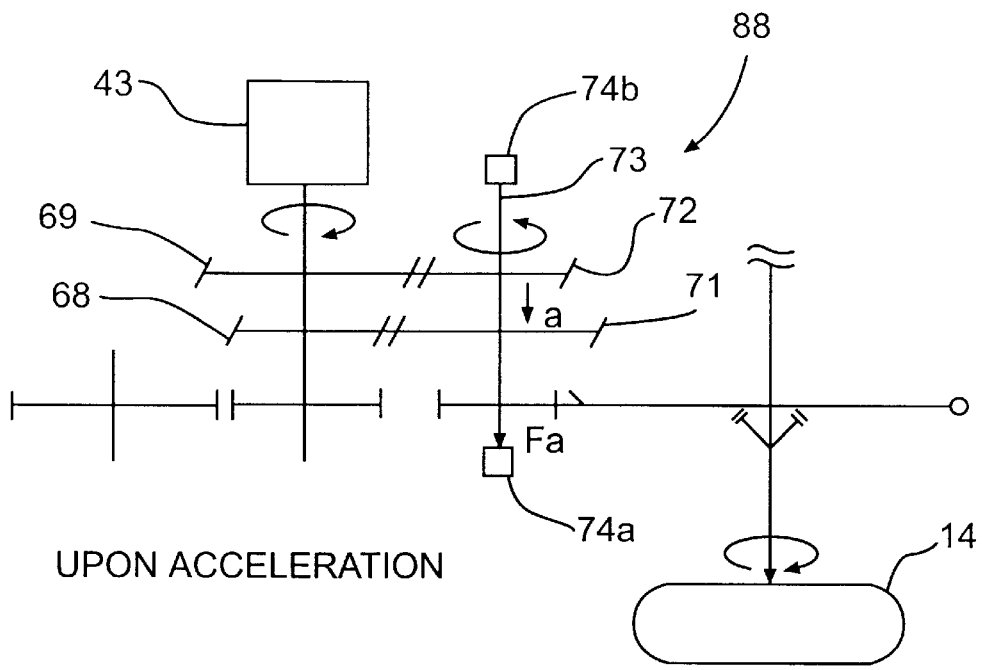
FIG. 9 is a diagram illustrating operation of the torque sensor unit.
Figure 9B:
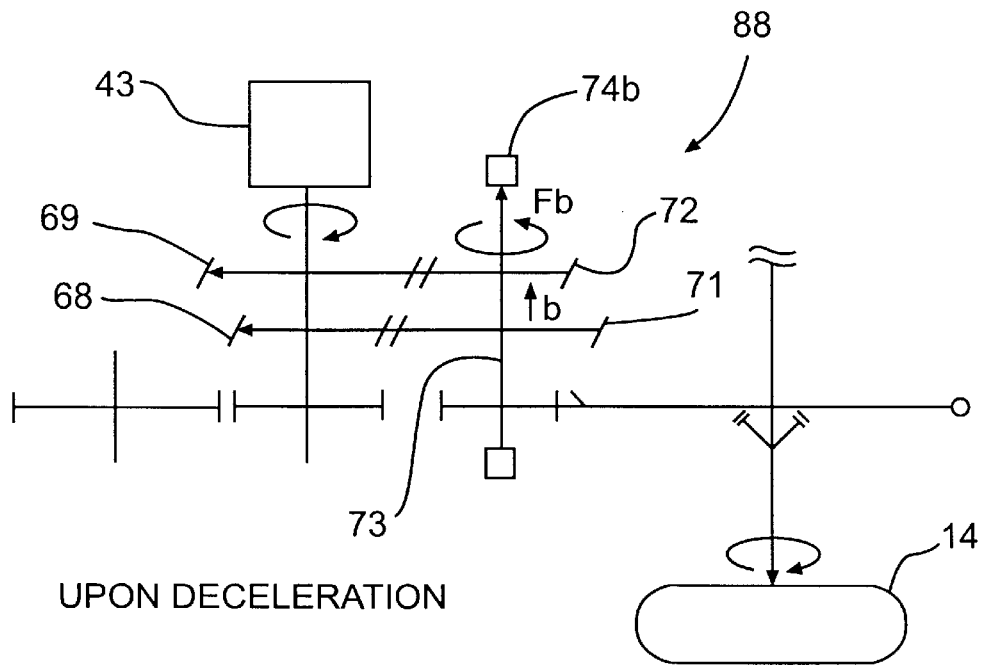

FIGS. 9(a) and 9(b) are diagrammatic views illustrating operation of the torque sensor unit 88 according to the present invention.

FIG. 9(a) illustrates operation of the torque sensor unit 88 upon acceleration. Upon acceleration, driving force is transmitted from the engine 61 or the motor 43 to the rear wheels 14. In particular, since the engine side first helical gear 68 and the motor side first helical gear 69 serve as the driving side while the engine side second helical gear 71 and the motor side second helical gear 72 serve as the driven side, the gears 71, 72 cause the countershaft 73 to generate a stress Fa as indicated by an arrow labeled a. This stress Fa is detected by the pressure sensor 74a.

FIG. 9(b) illustrates operation of the torque sensor unit 88 upon deceleration. Upon deceleration, driving force is transmitted from the rear wheels 14 to the motor 43. In particular, since the engine side second helical gear 71 and the motor side second helical gear 72 serve as the driving side while the engine side first helical gear 68 and the motor side first helical gear 69 serve as the driven side, the gears 68, 69 cause the countershaft 73 to generate a stress Fb as indicated by an arrow labeled b. This stress Fb is detected by the pressure sensor 74b.

By detecting the magnitude and the direction of transmission of the driving force using the pressure sensors 74a, 74b and by using the outputs of the pressure sensors 74a, 74b for feedback control, the driving forces of the engine 61 and the motor 43 can be used efficiently.

Since the torque sensor unit 88 is composed of the countershaft 73, pressure sensors 74a, 74b mounted at the opposite ends of the countershaft 73, engine side second helical gear 71 and motor side second helical gear 72 mounted on the countershaft 73, and engine side first helical gear 68 and motor side first helical gear 69 held in meshing engagement with the gears 71, 72, respectively, a torque detection mechanism which is compact and highly reliable can be implemented.

Figure 30A:
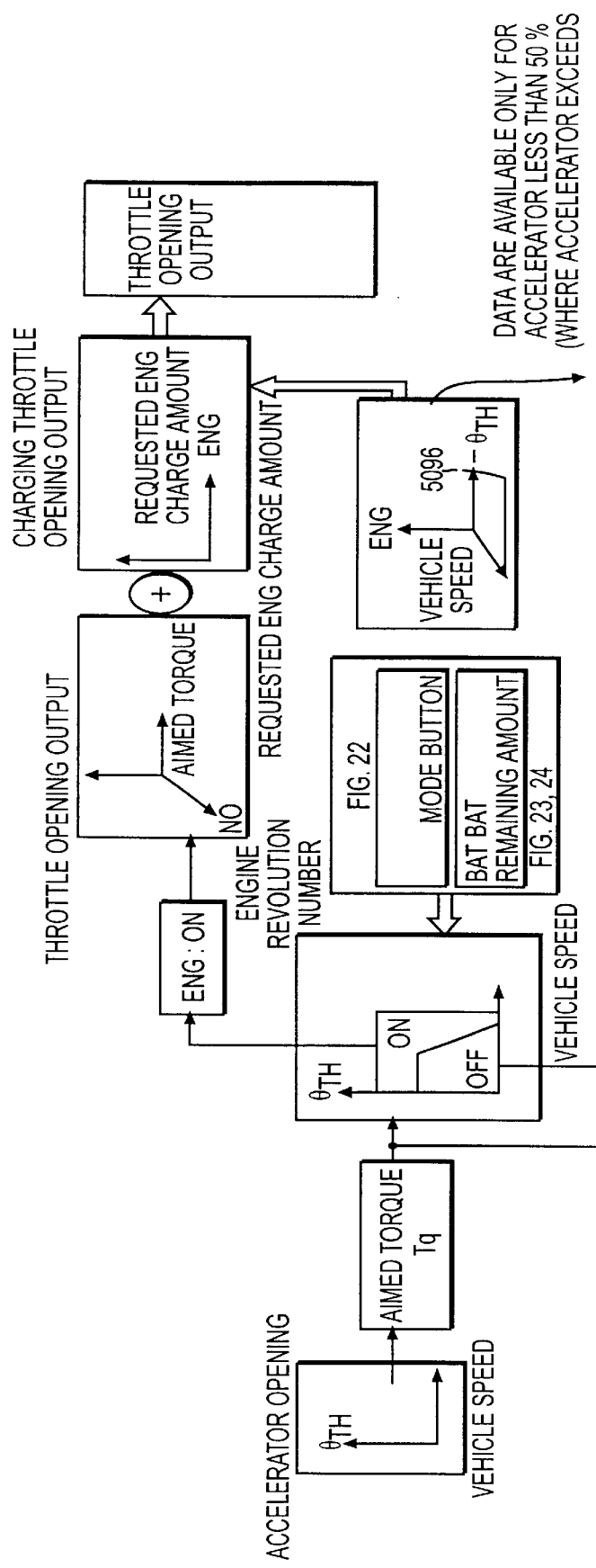
FIG. 30 is a diagram of a basic concept of control of the motor controlling apparatus for a hybrid car.
Figure 30B:
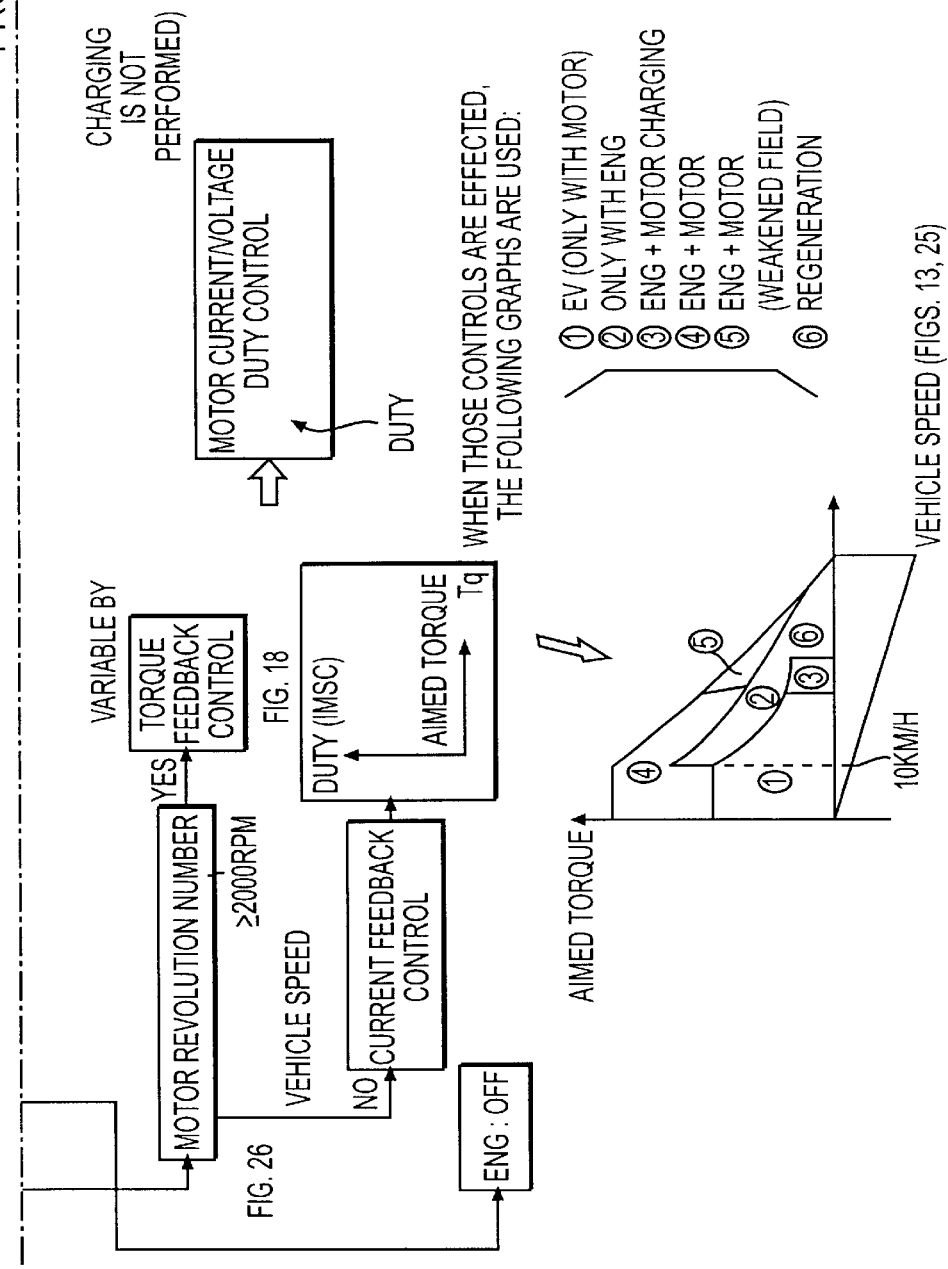

FIG. 30 is a diagram illustrating a basic control concept of the motor controlling apparatus for the hybrid car according to the present invention.

Figure 10:
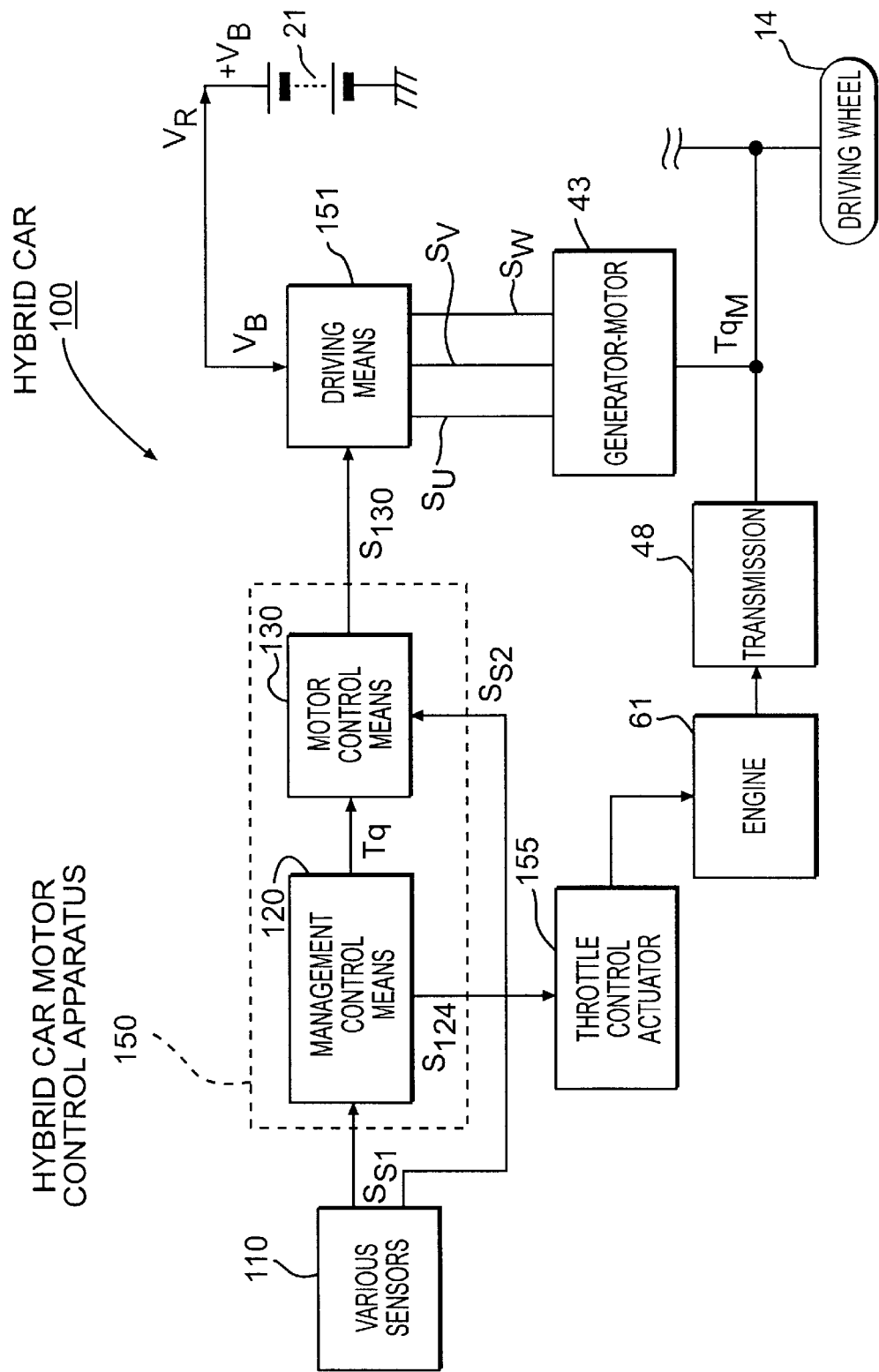
FIG. 10 is a block diagram of an entire construction of a form of the hybrid car.

FIG. 10 is a block diagram representing the hybrid car 100 according to the present invention. Referring to FIG. 10, the hybrid car 100 includes rear wheels 14, a generator-motor 43, a cone-type non-stage transmission 48, an engine 61, various sensors 110, batteries 21, a hybrid car motor control apparatus 150, driving means 151, and a throttle control actuator 155.

The various sensors 110 output a sensor signal $S_{S1}$ to management control means 120 of the hybrid car motor control apparatus 150.

The management control means 120 outputs a torque instruction value $T_q$ obtained by processing based on the sensor signal $S_{S1}$ to motor control means 130 and outputs a throttle aimed opening signal $S_{124}$ to the throttle control actuator 155.

The motor control means 130 outputs a control signal $S_{130}$ obtained by processing based on the torque instruction value $T_q$ and a sensor signal $S_{S2}$ to the driving means 151.

The driving means 151 outputs driving signals ($S_U$, $S_V$, $S_W$) obtained by processing the control signal $S_{130}$ and a battery voltage $V_b$ to the generator-motor 43.

Figure 15:
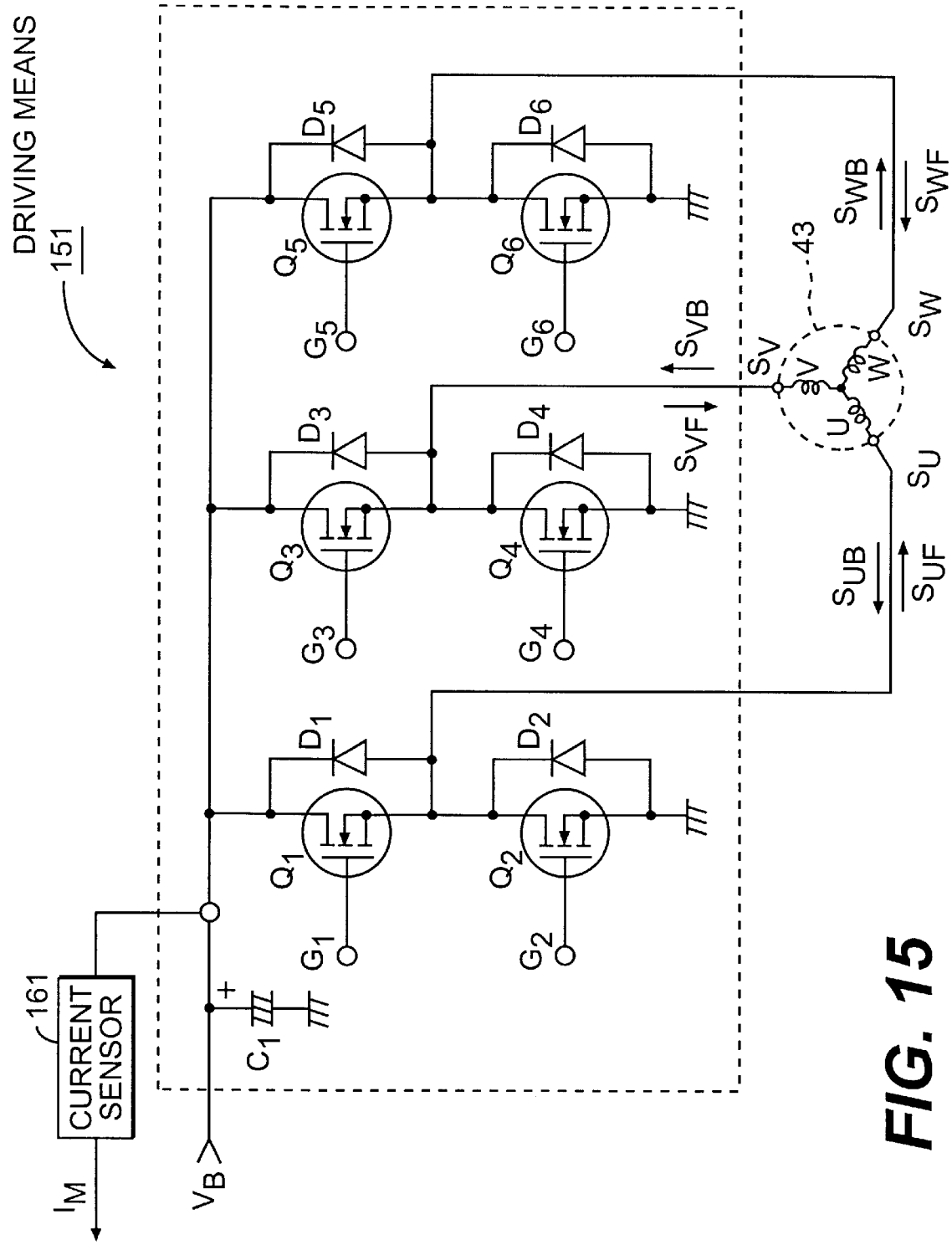
FIG. 15 is a circuit diagram of driving means.

The generator-motor 43 is driven or regenerates when the driving signals ($S_U$, $S_V$, $S_W$) are provided to coils of a U phase, a V phase and a W phase illustrated in FIG. 15. The generator-motor 43 either outputs motor torque $T_{qM}$ to the driving wheels 14 or charges the batteries 21 with regeneration power $V_r$.

Figure 20:
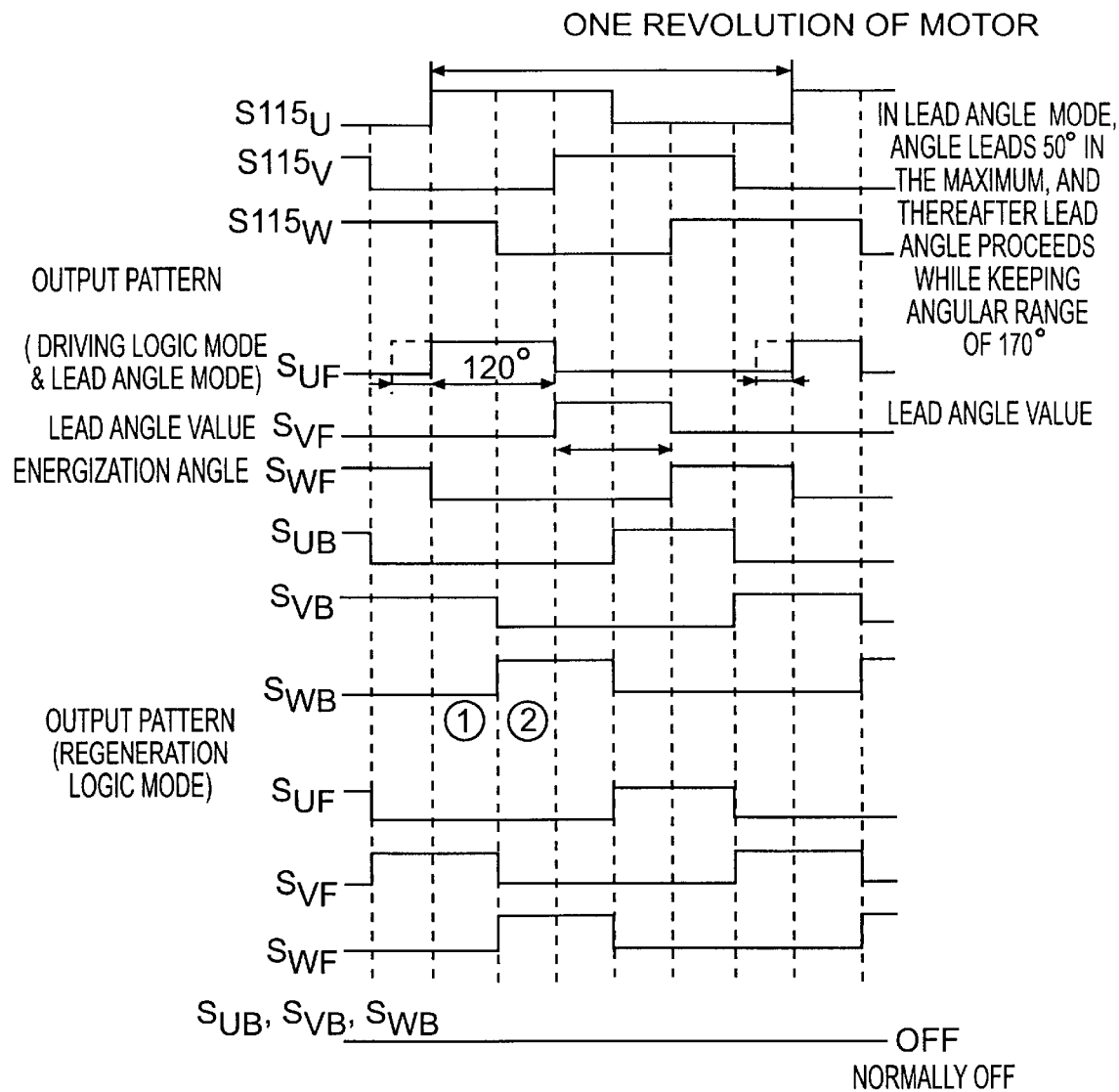
FIG. 20 is a waveform diagram of three-phase driving signals of the driving means.

Here, the driving signals Su, Sv, Sw are described with reference to FIG. 20. Referring to FIG. 20, reference symbols $S_{UF}$, $S_{VB}$, $S_{WF}$, $S_{UB}$, $S_{VF}$, $S_{WB}$ denote the directions of the driving signals $S_U$, $S_V$, $S_W$ illustrated in FIG. 15. For example, reference symbol $S_{UF}$ denotes a driving signal $S_U$ which is supplied from the batteries 21 to the U-phase of the generator-motor 43 when an FET $Q_1$ of the driving means 151 is on, and $S_{UB}$ denotes a driving signal $S_U$ which flows from the U-phase of the generator-motor 43 to the ground when another FET $Q_2$ of the driving means 151 is on.

Similarly, a driving signal $S_V$ which flows from the batteries 21 to the V-phase of the generator-motor 43 when a further FET $Q_3$ of the driving means 151 is on is denoted by $S_{VB}$. A driving signal $S_V$ which flows from the V-phase of the generator-motor 43 to the ground when a still further FET $Q_4$ is on is denoted by $S_{VB}$. A driving signal $S_W$ which is supplied from the batteries 21 to the W phase of the generator-motor 43 when a yet further FET $Q_5$ of the driving means 151 is on is denoted by $S_{WF}$. A driving signal $S_W$ which flows from the W phase of the generator-motor 43 to the ground when a yet further FET $Q_6$ is on is denoted by $S_{WB}$.

As illustrated in FIG. 20, within a period ①, the FET $Q_1$ and the FET $Q_4$ are in an on state, and the driving signal $S_{UF}$ flows to the U phase of the generator-motor 43 through the batteries 21→FET $Q_1$, and the driving signal $S_{VB}$ flows to the ground through the V phase of the generator-motor 43→FET $Q_4$.

In this manner, the current (driving signal) within the period ① flows from the U phase of the U phase, V phase and W phase of the three-phase coils of the generator-motor 43 to the V phase. This is synchronized with a rising edge of a magnetic pole position signal PM (115U) from a motor magnetic pole sensor 115 of the generator-motor 43. In short, the signal $S_{115U}$ detects an energization timing to the U phase, and control to cause current to flow from the coil of the U phase to the coil of the V phase is executed by UVW energization pattern generation means 135.

As also illustrated in FIG. 20, within another period ②, the FET $Q_6$ is turned on in place of the FET $Q_4$ (the FET $Q_4$ is in an off state) and the driving signal $S_{WB}$ flows, and the flow of the current (driving signal) from the U phase to the V phase is switched from the U phase to the W phase.

Figure 11:
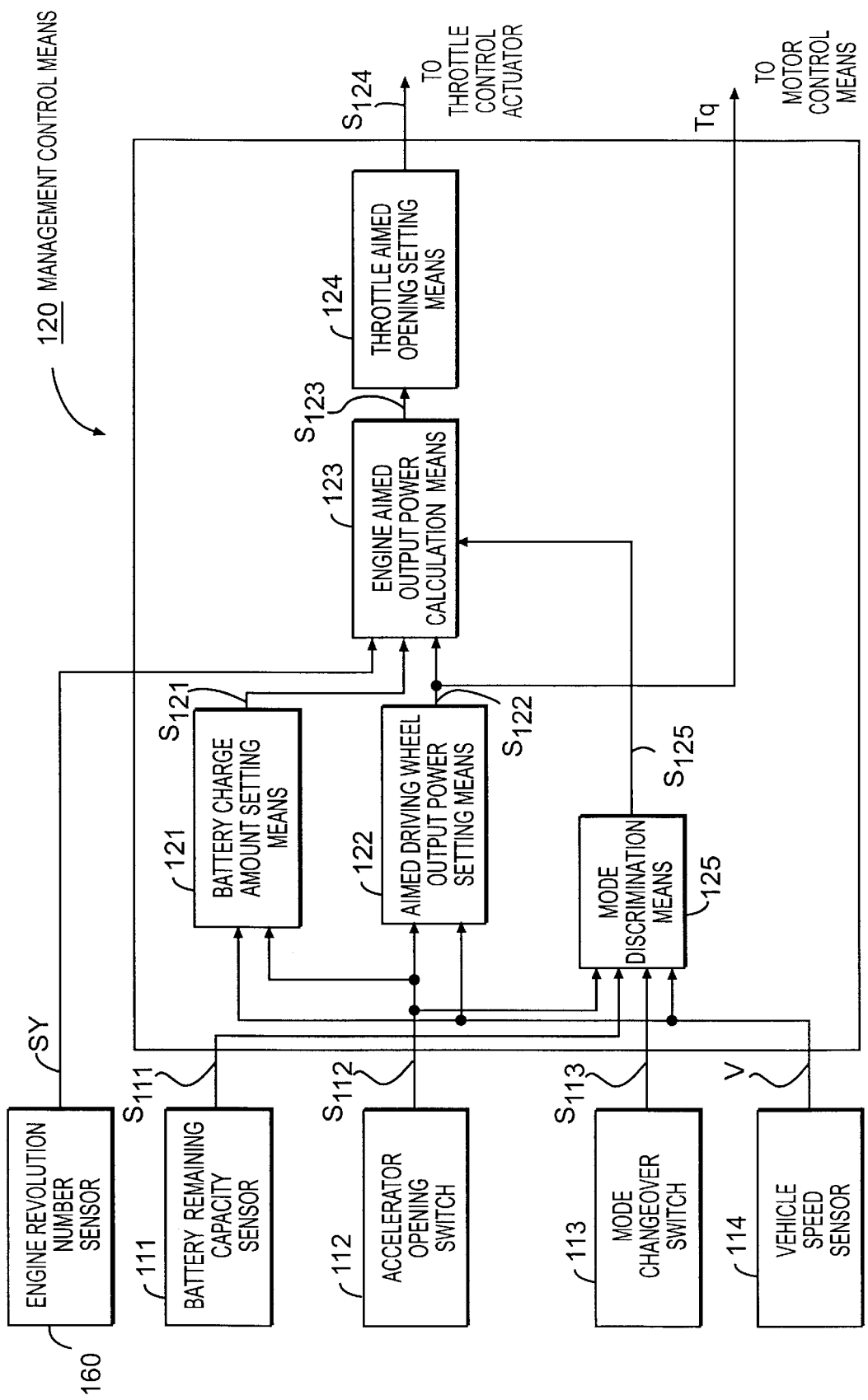
FIG. 11 is a block diagram of a construction of an important part of a form of management control means of a motor controlling apparatus for the hybrid car.
Figure 21:
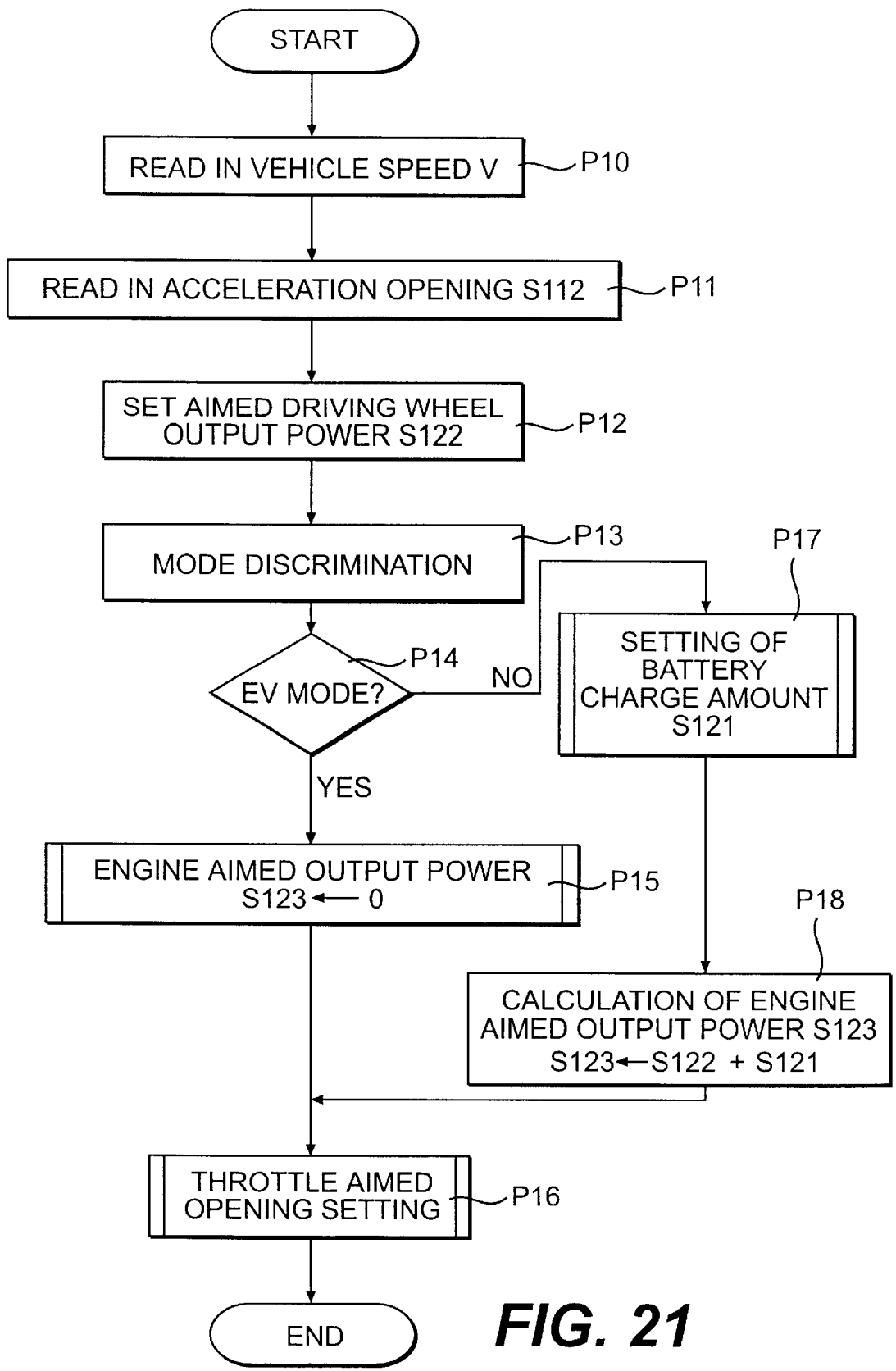
FIG. 21 is a flow chart of an operation of the management control means.

FIG. 11 is a block diagram of an important part of a form of the management control means of the motor controlling apparatus for a hybrid car, according to the present invention. Referring to FIG. 11, the management 30 control means 120 includes battery charge amount setting means 121, aimed driving wheel output power setting means 122, engine aimed output power calculation means 123, throttle aimed opening setting means 124, and mode discrimination means 125. It is to be noted that the operation described below is illustrated in an operation flow chart of the management control means 120 in FIG. 21.

An engine revolution number sensor 160 detects a revolution number of the engine and supplies a revolution number signal $S_Y$ to the engine aimed output power calculation means 123. A battery remaining capacity sensor 111 outputs a battery remaining capacity signal $S_{111}$ obtained by detecting the remaining capacity of the batteries 21 to the mode discrimination means 125.

The battery charge amount setting means 121 is formed from a memory such as a ROM. The ROM stores charging engine aimed output data required for the batteries 21. The data are indexed to an accelerator opening signal $S_{112}$ and a vehicle speed signal V. The battery charge amount setting means 121 outputs a battery charge amount signal $S_{121}$ obtained by reading out the charging engine aimed output data using the accelerator opening signal $S_{112}$ and the vehicle speed signal V as an address. The battery charge amount signal $S_{121}$ is sent to the engine aimed output power calculation means 123.

It is to be noted that the data stored in the ROM are stored only for a region wherein the accelerator opening is less than 50%, so that engine charging may be performed only in a region in which the engine efficiency is high.

An accelerator opening sensor 112 outputs the accelerator opening signal $S_{112}$ which relates to a detected operation amount (opening) of an accelerator pedal. The accelerator opening signal $S_{112}$ is received by the battery charge amount setting means 121, the aimed driving wheel output power setting means 122 and the mode discrimination means 125.

A vehicle speed sensor 114 outputs the vehicle speed signal V obtained by detecting the vehicle speed. The vehicle speed signal V is received by the battery charge amount setting means 121, the aimed driving wheel output power setting means 122 and the mode discrimination means 125.

The aimed driving wheel output power setting means 122 is formed from a memory such as a ROM which stores aimed driving wheel output data (torque $T_q$) corresponding to the accelerator opening signal $S_{112}$ and the vehicle speed signal V. The aimed driving wheel output power setting means 122 outputs an aimed driving wheel output signal $S_{122}$ (torque instruction value $T_q$) obtained by reading out the aimed driving wheel output data using the accelerator opening signal $S_{112}$ and the vehicle speed signal V as an address. The aimed driving wheel output signal $S_{122}$ is received by the engine aimed output power calculation means 123 and the motor control means 130.

A mode changeover switch 113 (refer to FIG. 12) outputs a mode signal $S_{113}$, obtained by changing over the running mode of the hybrid car 100, to the mode discrimination means 125.

The mode discrimination means 125 outputs a mode discrimination signal $S_{125}$, obtained by performing mode discrimination based on the battery remaining capacity signal $S_{111}$, the accelerator opening signal $S_{111}$, the mode signal $S_{113}$ and the vehicle speed signal V, to the engine aimed output power calculation means 123.

The engine aimed output power calculation means 123 calculates the engine aimed outputs, previously stored in the ROM, using the revolution number signal $S_Y$ and the aimed driving wheel output signal $S_{122}$ ($T_q$) as an address. Then, the engine aimed output power calculation means 123 calculates an engine aimed output power for battery charging based on the battery charge amount signal $S_{121}$ and the mode discrimination signal $S_{125}$, and outputs an engine aimed output power signal $S_{123}$, obtained by adding the two engine aimed output powers, to the throttle aimed opening setting means 124.

The throttle aimed opening setting means 124 in formed from a memory, such as a ROM, and stores throttle aimed opening data corresponding to the engine aimed a output power signal $S_{123}$. The throttle aimed opening setting means 124 outputs a throttle aimed opening signal $S_{124}$, obtained by reading out the throttle aimed opening data using the engine aimed output power signal $S_{123}$ as an address, to the throttle control actuator 155.

Figure 12:
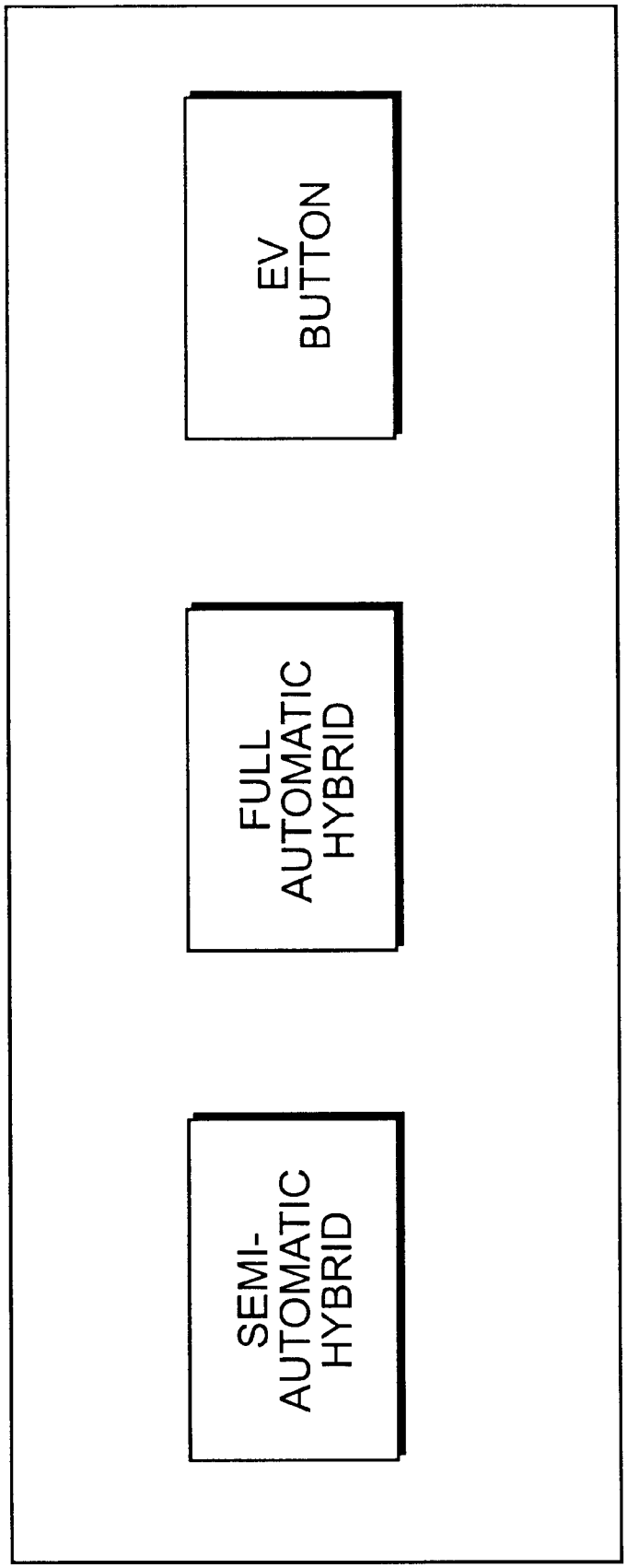
FIG. 12 is a diagram illustrating a mode changeover switch.

FIG. 12 is a diagrammatic view of the mode changeover switch 113. The mode changeover switch 113 changes over the running mode of the hybrid car 100 among the three modes of a semi-automatic mode, a full automatic mode and an EV (running only with the generator-motor 43) mode.

The semi-automatic mode is a mode wherein the driving output power condition of the generator-motor 43 is set higher than that of driving with the engine 61. In this mode, the car runs principally using the generator-motor 43. When the driving torque of the generator-motor 43 is insufficient, it is made up for by driving torque from the engine 61 and therefore, consumption of gasoline is suppressed. Accordingly, while the batteries 21 must be externally charged periodically, the fuel consumption of the engine 61 is better.

Figure 22:
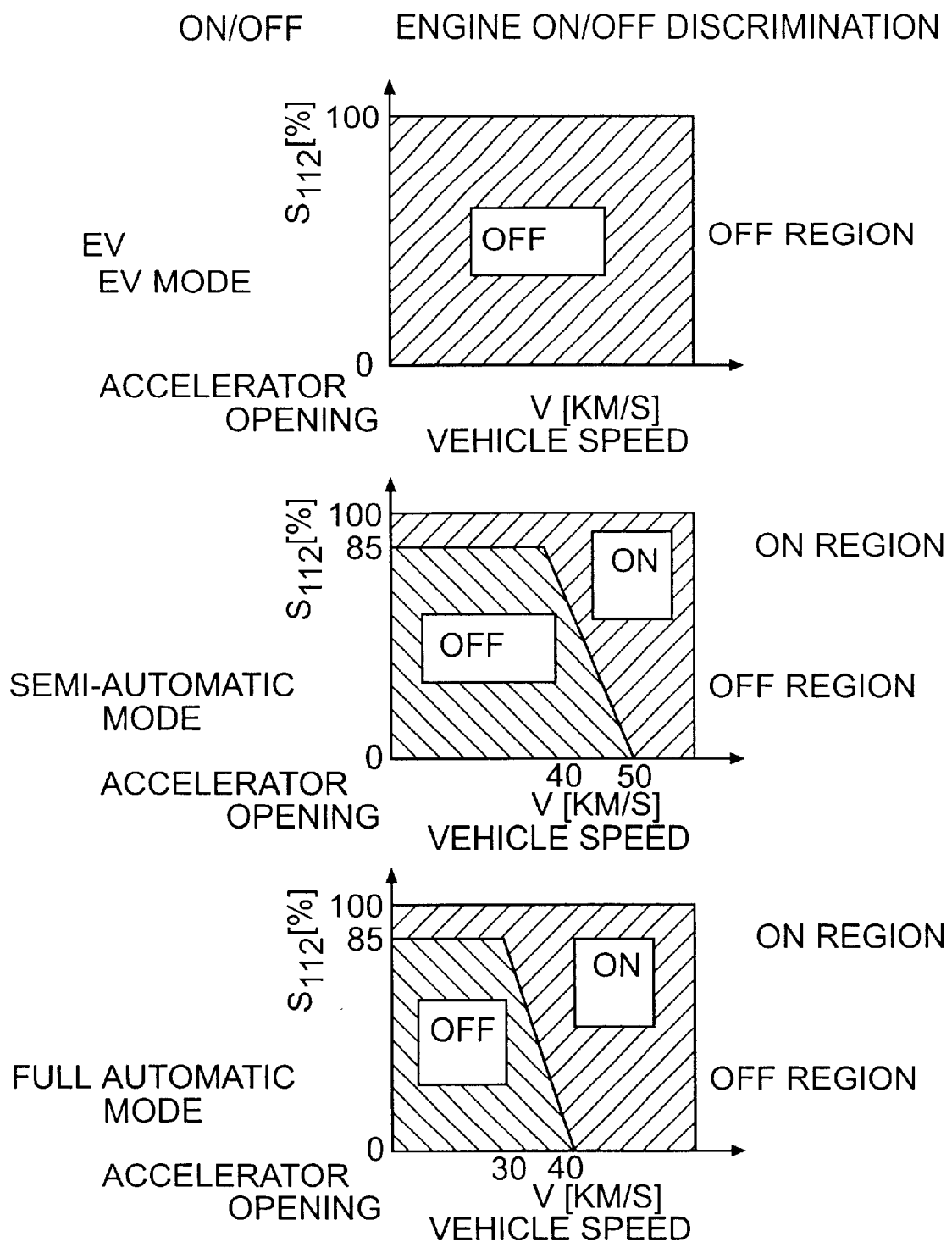
FIG. 22 is a diagram of ON/OFF discrimination of the engine.

The full automatic mode is a running mode wherein the driving output power condition of the engine 61 is set higher than that of driving with the generator-motor 43. In this mode, the car runs principally using the engine 61. When the driving torque by the engine 61 is insufficient, it is made up for by driving torque of the generator-motor 43 and therefore the battery capacity is maintained. Accordingly, the battery batteries 21 need not be externally charged. It is to be noted that an ON/OFF discrimination diagram of the engine is shown in FIG. 22 as a reference for ON/OFF operation of the engine in the three modes of the mode changeover switch 113.

Figure 14:
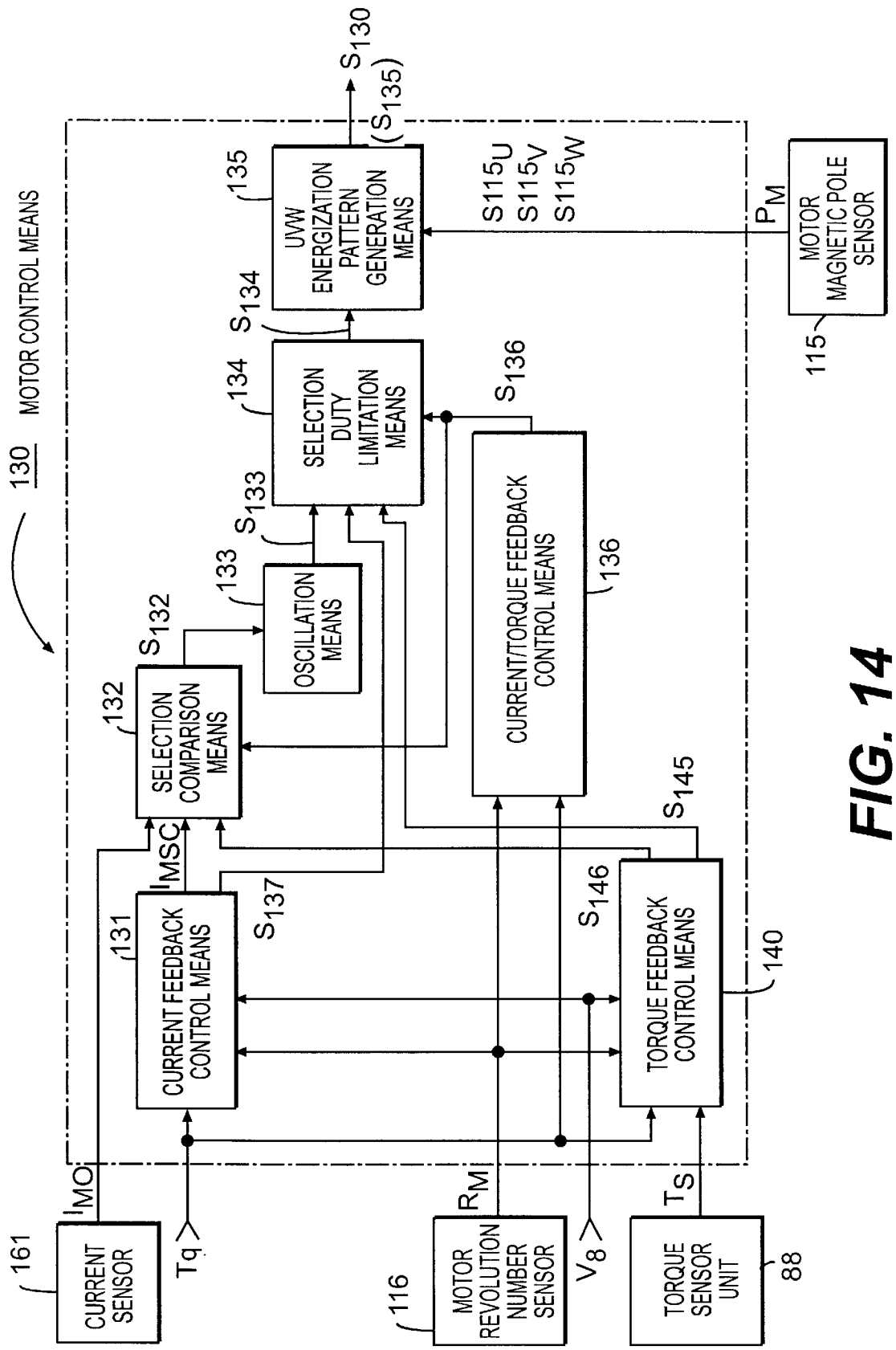
FIG. 14 is a block diagram of a construction of an important part of a form of motor control means of the motor controlling apparatus for the hybrid car.

FIG. 14 is a block diagram of an important part of a form of the motor control means of the motor controlling apparatus for a hybrid car according to the present invention. Referring to FIG. 14, the motor control means 130 includes current feedback control means 131, selection comparison means 132, oscillation means 133, selection duty limitation means 134, UVW energization pattern generation means 135, current/torque feedback control means 136, and torque feedback control means 140.

A motor revolution number sensor 116 outputs a motor revolution number signal $R_M$ obtained by detection of the revolution number of the generator-motor 43 to the current feedback control means 131, the torque feedback control means 140 and the current/torque feedback control means 136. The torque sensor unit 88 outputs a driving wheel torque signal $T_s$, obtained by detecting the torque of the rear wheels 14, to the torque feedback control means 140. It is to be noted that the motor revolution number sensor 116 may serve also as the motor magnetic pole sensor 115 which will be hereinafter described.

The current feedback control means 131 produces a correction aimed current $I_{MSC}$ and a duty limit signal $S_{137}$ based on the torque instruction value $T_q$, the motor revolution number signal $R_M$ and the battery voltage $V_B$. The current feedback control means 131 outputs the correction aimed current $I_{MSC}$ to the selection comparison means 132 and outputs the duty limit signal $S_{137}$ to the selection duty limitation means 134.

The torque feedback control means 140 outputs a duty/lead angle amount limit signal $S_{145}$ and a current limit signal $S_{146}$ based on the driving wheel torque signal TS, the torque instruction value $T_q$, the motor revolution number signal $R_M$ and the battery voltage $V_B$. The torque feedback control means 140 outputs the duty/lead angle amount limit signal $S_{145}$ to the selection duty limitation means 134 and outputs the current limit signal $S_{146}$ to the selection comparison means 132.

The current/torque feedback control means 136 produces a selection signal $S_{136}$ based on the torque instruction value $T_q$ and the motor revolution number signal $R_M$, and outputs the selection signal $S_{136}$ to the selection comparison means 132 and the selection duty limitation means 134.

Figure 26:
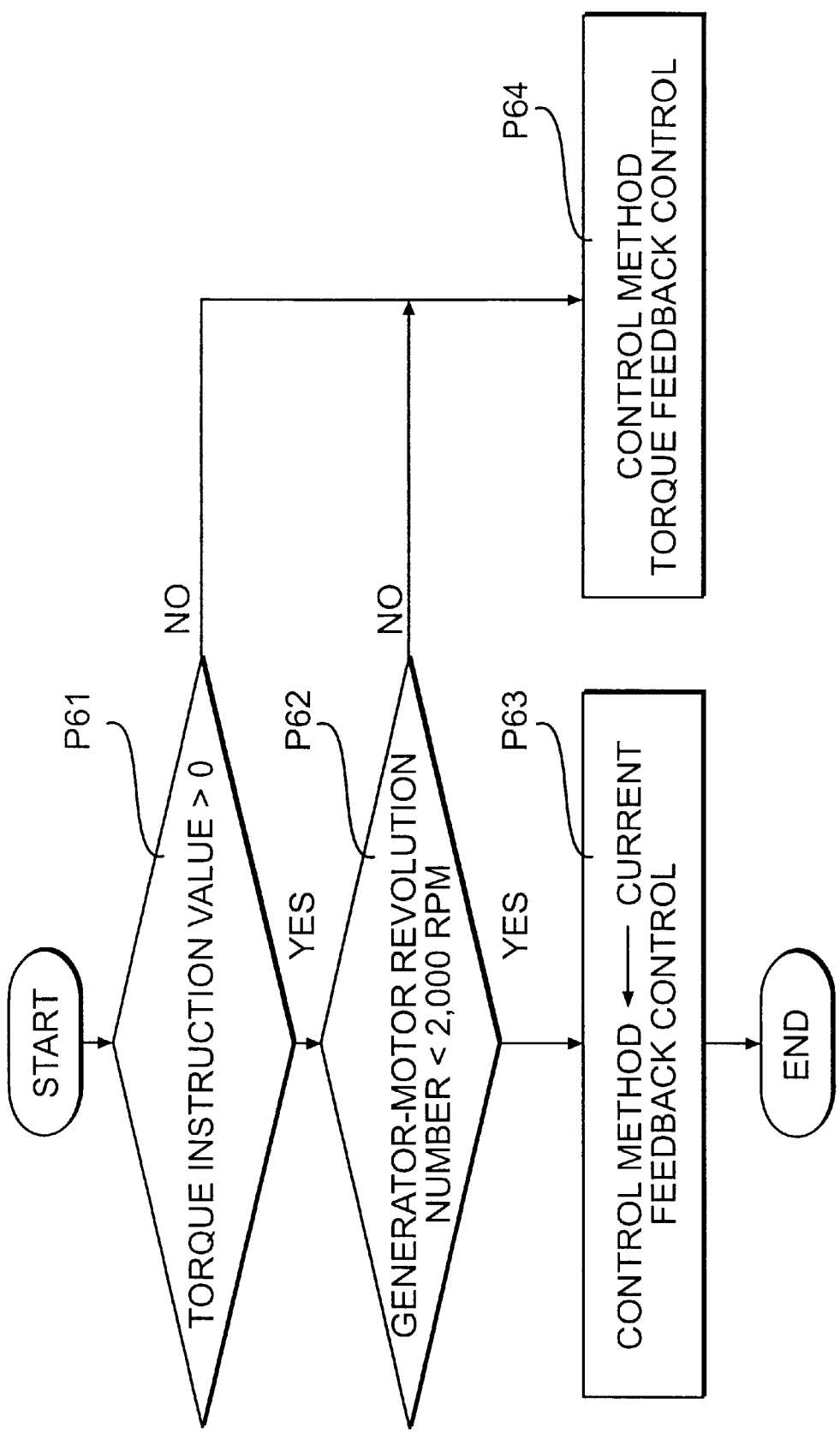
FIG. 26 is a flow chart of an operation of current/torque feedback control means.

FIG. 26 shows an operation flow chart of the current/torque feedback control means.

In step P61, it is discriminated whether or not the toque instruction value $T_q$ is higher than 0 ($T_q$>0), and if the discrimination is YES, then the control advances to step P62, but if the discrimination is NO, then the control advances to step P4.

In step P62, it is discriminated whether or not the motor revolution number signal $R_M$ is lower than 2,000 rpm ($R_M$<2,000 rpm). If the discrimination is YES, then the control advances to step P63. If the discrimination is NO, then the control advances to step P64. In step P63, the selection signal $S_{136}$ for setting the controlling method for the motor control means 130 to current feedback control is outputted. In step P64, the selection signal $S_{136}$ for setting the controlling method for the motor control means 130 to torque feedback control is outputted.

Figure 16:
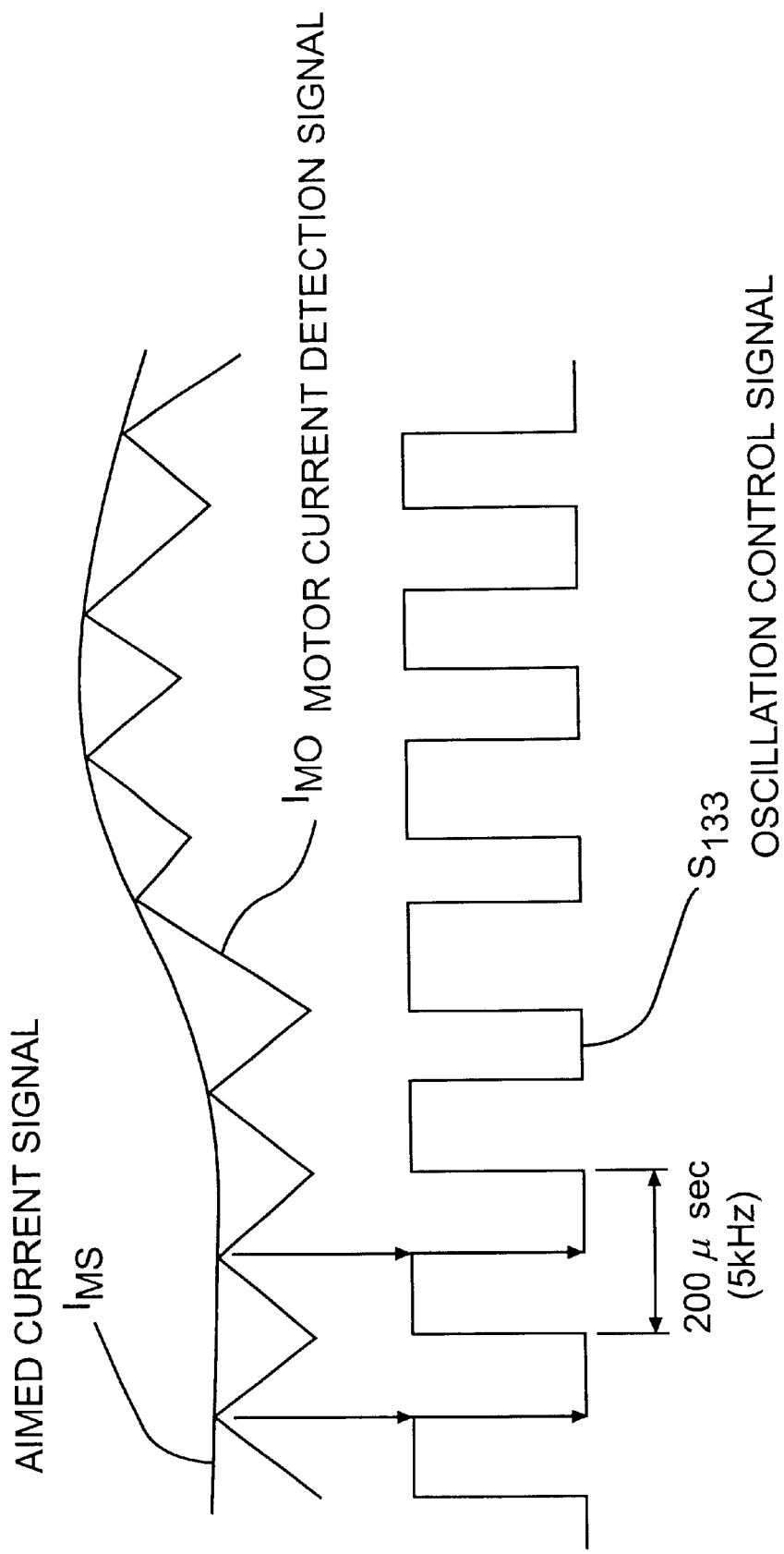
FIG. 16 is a diagram illustrating a relationship among an aimed current signal, a motor current detection signal and an oscillation control signal.

Referring back to FIG. 14, the selection comparison means 132 selects one of the correction aimed current $I_{MSC}$ and the current limit signal $S_{146}$ based on the selection signal $S_{136}$. The selection comparison means 132 compares the selected signal and a motor current detection signal $I_{MO}$ in magnitude. When the motor current detection signal $I_{MO}$ is equal to or higher than the selected signal ($I_{MO} \geq I_{MS}$ or $S_{146}$), a reset signal $S_{132}$ is sent to the oscillation means 133 (refer to FIG. 16).

The oscillation means 133 oscillates pulses of, for example, 5 KHz and outputs an oscillation control signal $S_{133}$ (refer to FIG. 16) obtained by resetting the pulse oscillation output by the reset signal $S_{132}$ to zero to control the duty to the selection duty limitation means 134. The selection duty limitation means 134 outputs a duty limit control signal $S_{134}$ to the UVW energization pattern generation means 135. The duty limit control signal $S_{134}$ is obtained by limiting the duty of the oscillation control signal $S_{133}$ (refer to FIG. 16) with one of the duty limit signal S137 and the duty/lead angle amount limit signal $S_{145}$, selected based on the selection signal $S_{136}$.

The motor magnetic pole sensor 115 generates three kinds of timing signals at intervals of 120 degrees in conformity with the U phase, the V phase and the W phase of the motor coils. The motor magnetic pole sensor 115 outputs a magnetic pole position signal $P_M$ ($S_{115U}$, $S_{115V}$, $S_{115W}$), obtained by detecting the positions of the magnetic poles of the generator-motor 43 as shown in FIG. 20, to the UVW energization pattern generation means 135.

The UVW energization pattern generation means 135 outputs a driving control signal $S_{130}$, obtained by producing energization patterns of the U, V and W phases of the three-phase DC brushless generator-motor 43 based on the duty limit control signal $S_{134}$ and the magnetic pole position signal $P_M$, to the driving means 151.

Figure 27:
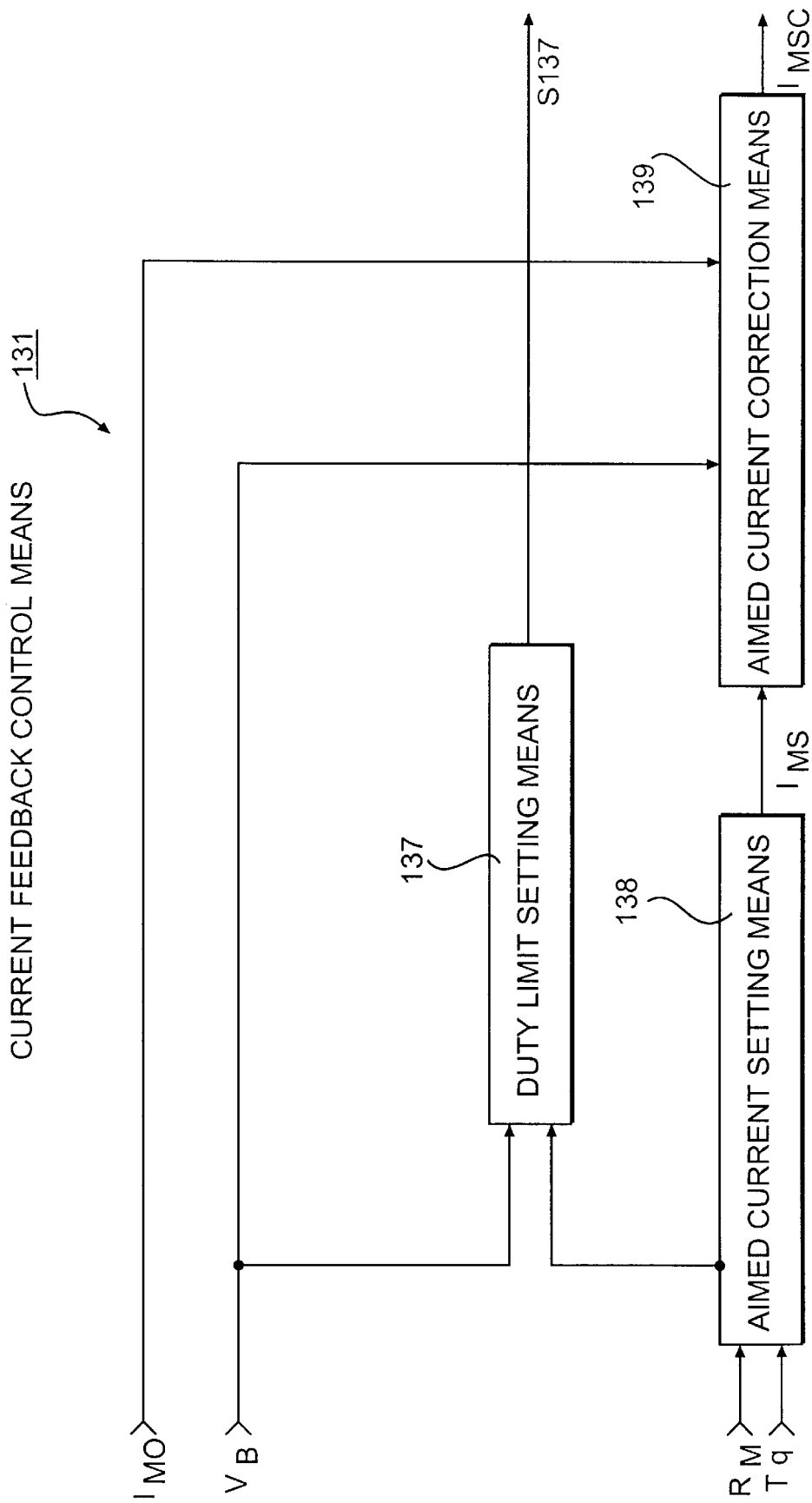
FIG. 27 is a block diagram of a construction of an important part of a form of current feedback control means.

FIG. 27 is a block diagram of an important part of a form of the current feedback control means according to the present invention. Referring to FIG. 27, the current feedback control means 131 includes duty limit setting means 137, aimed current setting means 138 and aimed current correction means 139. The duty limit setting means 137 output a duty limit signal $S_{137}$ for limiting the duty of the oscillation control signal $S_{133}$, based on the battery voltage $V_B$ and the motor revolution number signal $R_M$, to the selection duty limitation means 134.

The aimed current setting means 138 is formed from a memory, such as a ROM, and stores aimed current data corresponding to the torque instruction valve $T_q$ and the motor revolution number signal $R_M$. The aimed current setting means 138 outputs an aimed current signal $I_{MS}$ obtained by reading out the aimed current data using the torque instruction value $T_q$ and the motor revolution number signal RM as an address, to the aimed current correction means 139. The aimed current correction means 139 outputs a correction aimed current $I_{MSC}$, obtained by correction processing of the aimed current signal $I_{MS}$ based on the motor current detection signal $I_{MO}$ and the toque instruction value $T_q$, to the selection comparison means 132.

Figure 28:
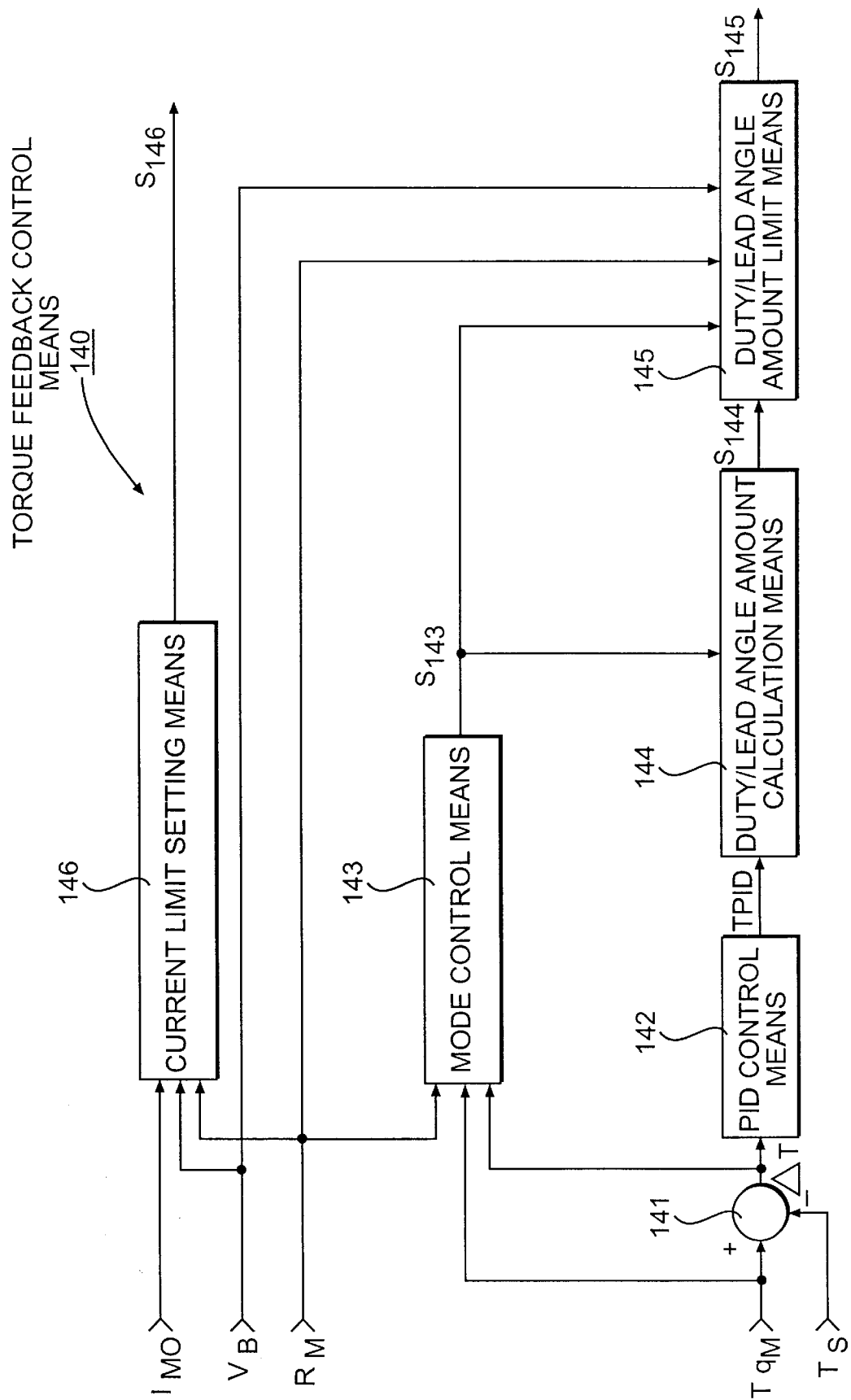
FIG. 28 is a block diagram of a construction of an important part of a form of torque feedback control means.

FIG. 28 is a block diagram of an important part of a form of the torque feedback control means according to the present invention. Referring to FIG. 28, the torque feedback control means 140 includes current limit setting means 146, mode control means 143, deviation calculation means 141, PID (proportional plus integral plus derivative) control means 142, duty/lead angle amount calculation means 144, and duty/lead angle amount limit means 145.

The current limit setting means 146 is formed from a memory, such as a ROM. The ROM stores current limit data corresponding to the motor current detection signal $I_{MO}$, the battery voltage $V_B$ and the motor revolution number signal $R_M$. The current limit setting means 146 outputs a current limit signal $S_{146}$, obtained by reading out; the current limit data using the motor current detection signal $I_{MO}$, the battery voltage $V_B$ and the motor revolution number signal $R_M$ as an address, to the selection comparison means 132.

The PID control means 142 is composed of a proportional element, an integral element, a derivative element and addition means not shown. The proportional element performs P (proportional control) for a deviation signal $\Delta T$. The integral element performs I (integral control) for the deviation signal $\Delta T$. The derivative element performs D (derivative control) for the deviation signal $\Delta T$. The addition means outputs a PID control signal $T_{pid}$ obtained by adding outputs of the elements to the duty/lead angle amount calculation means 144.

The mode control means 143 produces a mode control signal $S_{143}$ for controlling the torque feedback control means 140 to a duty control mode or a lead angle amount control mode, based on the motor revolution number signal $R_M$, the torque instruction value $T_q$ and the deviation signal $\Delta T$. The mode control means 143 outputs the mode control signal $S_{143}$ to the duty/lead angle amount calculation means 144 and the duty/lead angle amount limit means 145.

The duty/lead angle amount calculation means 144 outputs a duty/lead angle amount signal $S_{144}$, obtained by calculation of a duty or a lead angle amount based on the PID control signal $T_{pid}$ and the mode control signal $S_{143}$, to the duty/lead angle amount limit means 145. The duty/lead angle amount limit means 145 outputs a duty/lead angle amount limit signal $S_{145}$, obtained by limiting the duty/lead angle amount signal $S_{144}$ based on the battery voltage $V_B$, the motor revolution number signal RM and the mode control signal $S_{143}$, to the selection duty limitation means 134.

Figure 17:
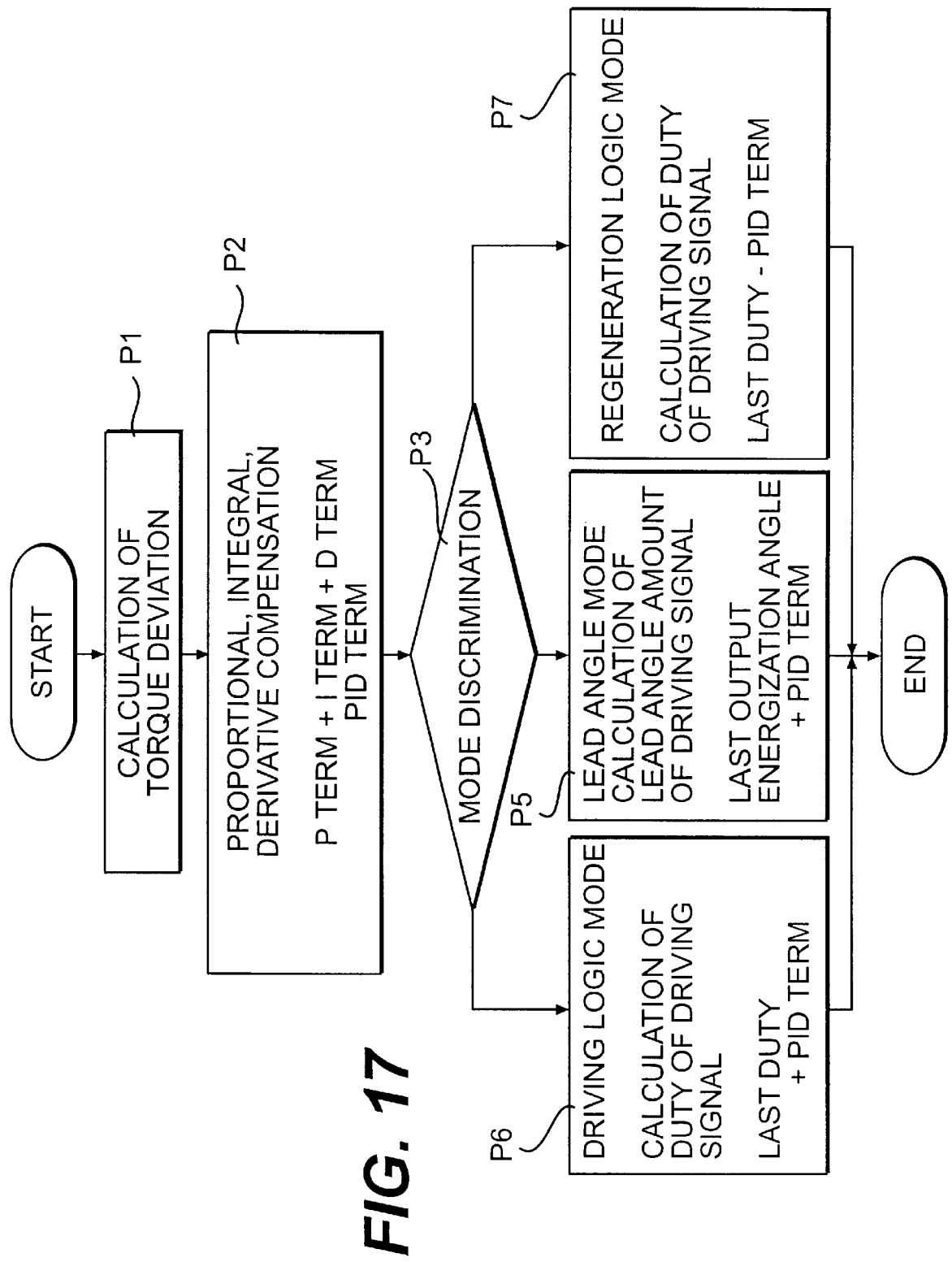
FIG. 17 is a flow chart of an operation of torque feedback control means and mode control means.

FIG. 17 is an operation flow chart of the torque feedback control means and the mode control means. In step P1, a torque deviation calculation ($\Delta T = T_q - T_s$), to be performed by the deviation calculation means 141 is performed to calculate a deviation signal $\Delta T$. Then, the control advances to step P2. In step P2, PID compensation is performed for the deviation signal $\Delta T$ by the PID control means 142, hereafter the control advances to step P3. In step P3, mode discrimination, which will be hereinafter described with reference to FIG. 18, is performed, and the control advances to one of steps P5 to P7 in accordance with the discrimination.

In step P5, the duty/lead angle amount calculation means 144 enters a lead angle mode, in which it performs calculation of the lead angle amount. In step P6, the duty/lead angle amount calculation means 144 enters a driving logic mode, in which it performs calculation of the duty. In step P7, the duty/lead angle amount calculation means 144 enters a regeneration logic mode, in which it performs calculation of the duty.

Figure 18:
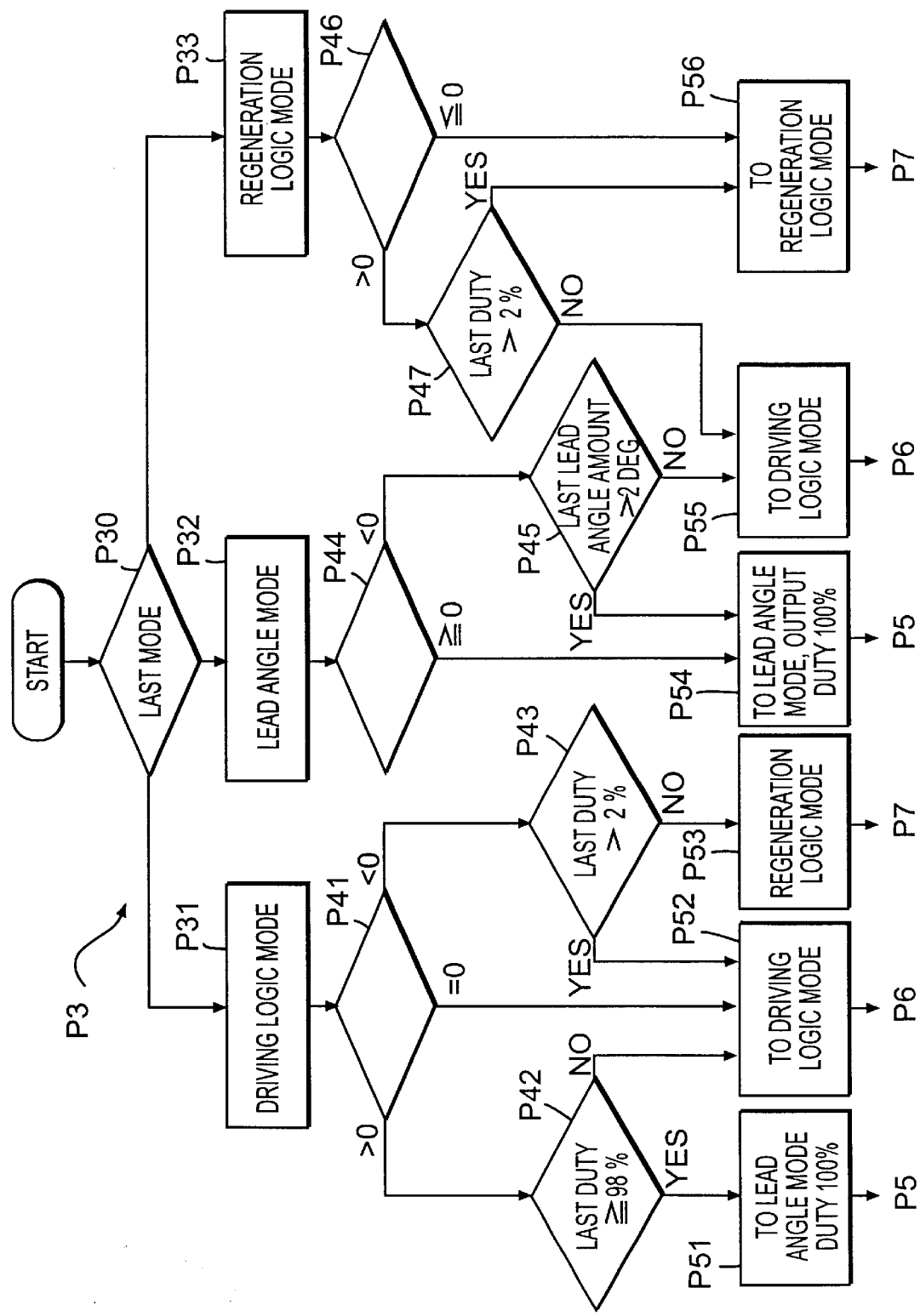
FIG. 18 is a flow chart of discrimination among a driving logic mode, a lead angle mode and a regeneration logic mode.

Here, the discrimination flow of FIG. 18 is described with reference to FIGS. 15, 17 and 20. The lead angle mode is control wherein, as indicated by a broken line in output waveforms of FIG. 20 (the driving signal $S_{UF}$ is taken as an example), the signals of $S_U$, $S_V$ and $S_W$ which make driving signals are turned on (led) rather early with respect to the signals $S_{115U}$, $S_{115V}$ and $S_{115W}$ of the motor magnetic pole sensor 115. This can change the characteristic of the motor to that of a low torque high rotation type, and particularly can increase the torque upon high rotation. This rotates the motor at a high speed by decreasing the fields of the motor coils, and is called field-weakening control. The lead angle is proceeded while the normal energization angle of 120° is continuously increased, and after the energization angle is increased to 170°, the lead angle is further increased while the energization angle is held at 170°.

In the flow chart illustrated in FIG. 18 in the first step P30, the preceding control mode is discriminated as to which one of the driving logic modes, the lead angle mode and the regeneration logic mode. Then, for the discriminated driving logic mode (step P31), lead angle mode (step P32) or regeneration logic mode (step P33), discrimination of whether a deviation $\Delta T$ (=$T_q$-$T_s$) between the aimed torque ($T_q$) and the current torque ($T_s$) is positive (+), zero (0) or negative (-) is executed (steps P41, P44 and P46).

If it is discriminated in step P41 that the deviation $\Delta T$ is positive ($\Delta T>0$), then since the current torque ($T_s$) is insufficient with respect to the aimed torque ($T_q$), the control advances to step P42. In step P42, the duty (Duty) in the last energization to the motor is equal to or higher than 98%. If the last duty is equal to or higher than 98%, then the control advances to step P51. In step P51, the lead angle mode is entered and the duty is set to 100%. Accordingly, field-weakening control is started at this point of time. In the lead angle mode, an energization angle wherein PID (proportional, integral and derivative) terms are added to the last energization angle is determined (step P5 of FIG. 17), and an angle by which the determined-energization angle exceeds the ordinary energization angle (120°) is led as indicated by a broken line in FIG. 20.

Conversely, when the last duty in step P42 is lower than 98%, and when it is discriminated in step P41 that the deviation $\Delta T$ is zero ($\Delta T=0$), the control advances to step P52, in which the driving logic mode is entered, and a duty obtained by adding PID (proportional, integral and derivative) terms to the last energization duty is outputted as a driving signal (step P6 shown in FIG. 17).

When it is discriminated in step P41 that the deviation $\Delta T$ is negative ($\Delta T<0$), the control advances to step P43, in which discrimination of whether or not the last duty exceeds 2% is executed. If the last duty exceeds 2%, then the control advances to step P52, in which the driving logic mode is entered, but if the last duty is equal to or lower than 2%, then the control advances to step P53, in which the regeneration logic mode is entered. If the deviation $\Delta T$ is negative ($\Delta T<0$), then since also the PID terms become positive->0->negative. Although the PID terms are added (step P6 illustrated in FIG. 17) in the driving logic mode (step P52), the energization duty continues to decrease within the period within which the deviation $\Delta T$ is negative ($\Delta T<0$).

As the duty decreases, also the current torque ($T_s$) decreases, and if the aimed torque ($T_q$) is positive, then when the current torque ($T_s$) and the aimed torque ($T_q$) become equal to each other ($T_q$=$T_s$), the deviation $\Delta T$ becomes $\Delta T=0$, and also the PID terms become 0. The duty becomes stable with the value at the present point of time, and fixed torque operation is entered.

If the aimed torque ($T_q$) is negative ($T_q<0$), for example when the vehicle is decelerating, since the deviation $\Delta T$ remains negative by whichever amount the energization duty decreases. At a point in time when the energization becomes equal to or lower than 2%, the mode of the motor changes from the driving logic mode to the regeneration logic mode (step S53), and the motor enters a regeneration braking condition to generate a deceleration feeling. At this point of time, a regeneration mode is started.

The regeneration logic mode is a mode wherein, as illustrated in FIG. 20, the coils of the U phase, the V phase and the W phase and the batteries are put into an on-state by the FETs $Q_1$, $Q_3$ and $Q_5$, so that the coils may have connection timings for each 120 degrees. In the regeneration logic mode, the PID terms are subtracted from the last duty to calculate a motor duty (step P7 of FIG, 17). While the deviation $\Delta T$ is equal to or lower than 0 ($\Delta T \leq 0$) (from step 46 to step P56), also the PID terms are equal to or lower than 0, and the energization duty of the motor is substantially increased from a minimum value equal to or lower than 2% and regeneration braking increases.

Consequently, since the value of the current torque ($T_s$) becomes negative ($T_s<0$) by the regeneration braking, both of the aimed torque ($T_q$) and the torque ($T_s$) become negative values, and the deviation $\Delta T$ gradually approaches 0 from the negative value. Thereafter, at the point in time when the deviation $\Delta T$ becomes positive ($\Delta T>0$) (step P46), the regeneration logic mode is continued before the last duty becomes lower than 2% (step P56). This occurs because the PID terms become positive as the deviation $\Delta T$ becomes positive, the duty decreases. Then, at the point of time when the duty becomes lower than 2%, the driving logic mode is entered (the control advances from step P55 to step 6 of FIG. 17). Accordingly, the regeneration logic mode comes to an end at this point in time.

If the deviation AT is positive, then since also the PID terms are positive, the duty is now increased by the calculation in step P6 illustrated in FIG. 17. Then, in step P44, if the deviation $\Delta T$ is equal to or higher than 0 ($\Delta T \geq 0$), since the last mode is the lead angle mode, an increase of the torque is demanded continuously, and the lead angle mode is continued through step P54 (step P5 of FIG. 17

Conversely, if the deviation AT is negative ($\Delta T<0$) in step P44, then the lead angle mode is continued until the last lead angle amount becomes equal to or smaller than 2 degrees ($\geq 2$ deg.) (from step P45 to step P5 of FIG. 17 ). In this instance, in step P5, the PID terms are added to the last energization angle. However, since the deviation $\Delta T$ is negative ($\Delta T<0$), the PID terms themselves change to negative values. Consequently, at a point in time when the lead angle amount becomes equal to or smaller than 2 degrees, the driving logic mode is entered (step P6 of FIG. 17 ). Accordingly, the field-weakening control is ended at this point in time.

By switchably controlling the mode among the driving logic mode, the lead angle mode and the regeneration logic mode in response to the value of the deviation ΔT to effect control, torque feedback control confirming to a desired aimed torque ($T_q$) can be performed. It should also be noted that while the driving signals ($S_U$, $S_V$ and $S_W$) of FIG. 20 are on (in the H level state) in all of the modes, a delicate duty pulse is outputted as shown in FIG. 29 so that the effective voltage of the motor is controlled.

Figure 19:
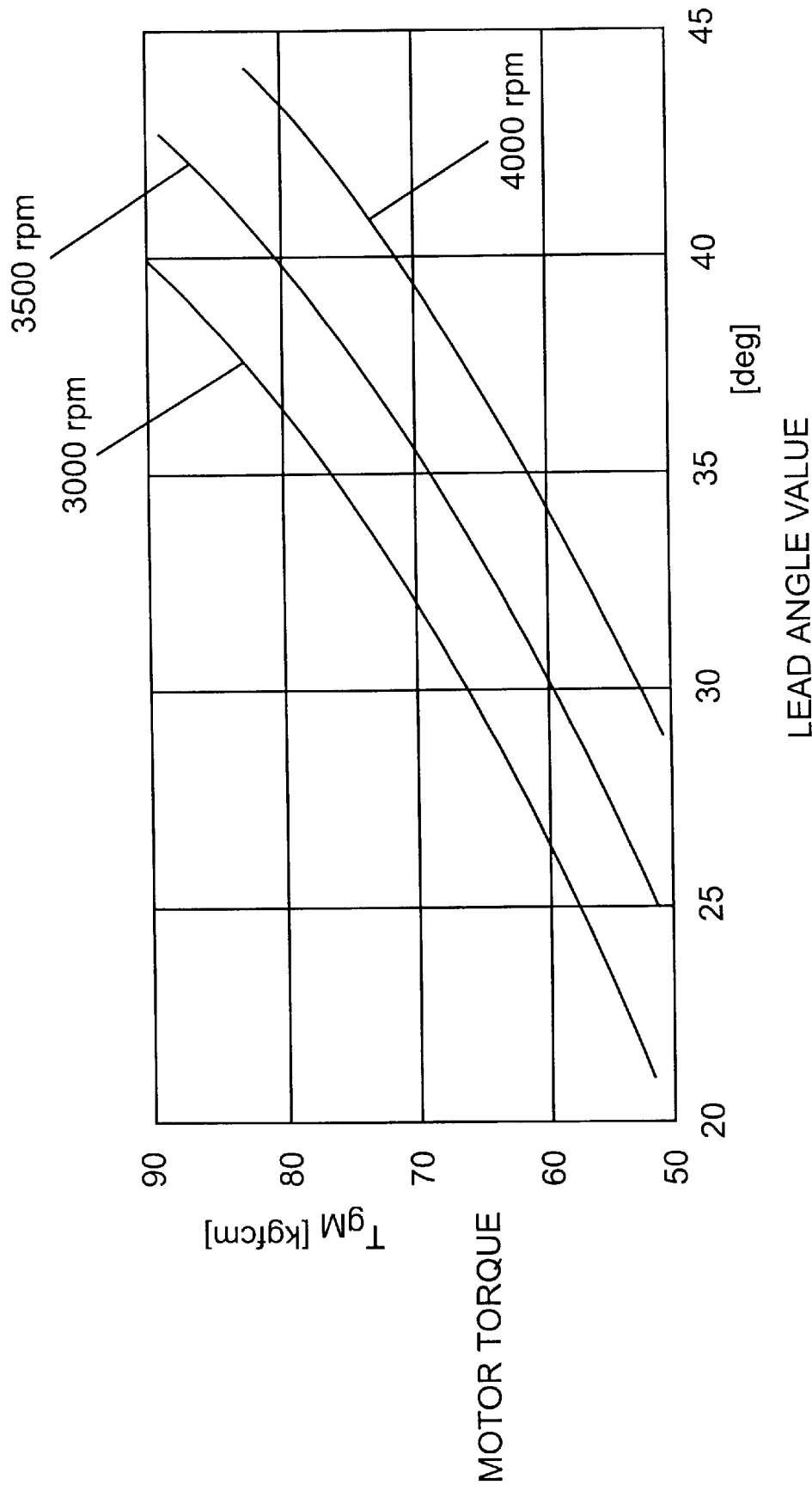
FIG. 19 illustrates a motor torque characteristic with respect to a lead angle value of the motor.

FIG. 15 shows a circuit of the driving means. Referring to FIG. 15, the driving means 151 includes N-channel FETs ($Q_1$ to $Q_6$), flyback diodes (D1 to D6), and a capacitor C1. The driving means 151 receives an on/off signal of the driving control signal $S_{130}$ at the gates (G2, G4 and G6) and a PWM signal of the driving control signal $S_{130}$ at the gates (G1, G3 and G5). The driving means 151 outputs such driving signals ($S_U$, $S_V$ and $S_W$, or $S_{UF}$, $S_{VF}$ and $S_{WF}$, or else $S_{UB}$, $S_{VB}$ and $S_{WB}$) as shown in FIG. 19 to the three-phase DC brushless generator-motor 43 to control driving of the generator-motor 43.

The hybrid car 100 also includes the rear wheels 14, the generator-motor 43, the transmission 48, the engine 61, the various sensors 110, the batteries 21, the hybrid car motor control apparatus 150, the driving means 151, driving/regeneration changeover means 152 and the throttle control actuator 155. The hybrid car 100 discriminates a full automatic mode wherein the engine is driven only within a range within which the fuel consumption efficiency is high and generation energy, obtained by driving the generator-motor with the engine output power, is used to charge the batteries while the car is running. The hybrid car 100 also discriminates a semi-automatic mode wherein the generator-motor is driven with supply power from the batteries to cause the car to run and, only when the driving force of the generator-motor is insufficient, the engine driving force is assisted, by a switching operation of the mode switch to control driving of the engine and the generator-motor so that running principally with the engine or running principally with the EV (generator-motor) can be performed, when rotation of the generator-motor is low, current feedback control by which the motor current can be controlled with a high degree of accuracy whereas it performs torque feedback control in a high vehicle speed-high torque region, and controls the allowable maximum motor current value to protect the generator-motor from excessive current and can raise the fuel consumption efficiency of the engine. Consequently, also it is possible to reduce to current sensors 161 to one, and reduction in cost is possible.

Figure 13:
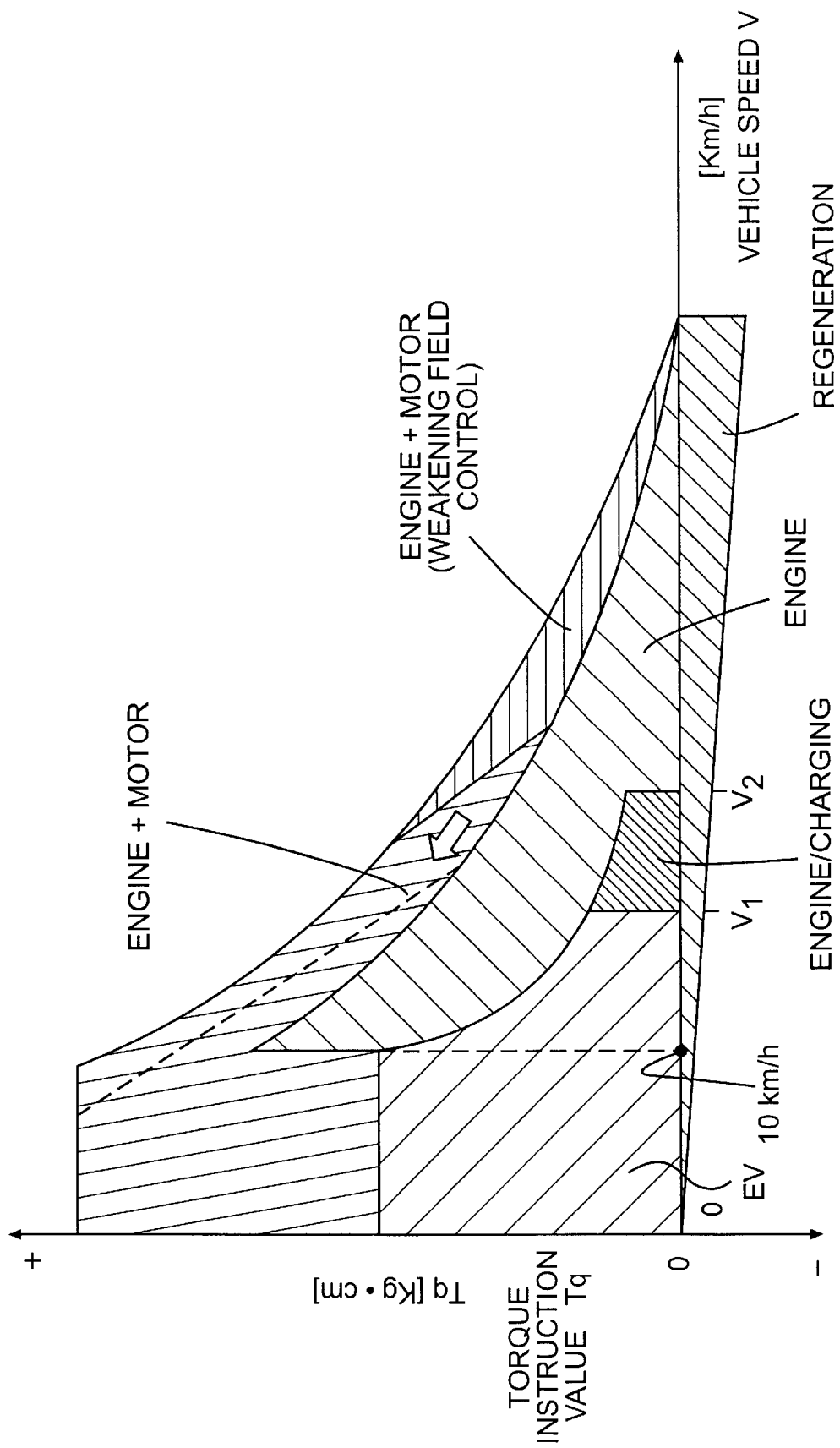
FIG. 13 is a diagram illustrating driving regions of an engine and a motor in the hybrid car.

FIG. 13 is a diagram illustrating the driving regions of the engine and the motor of the hybrid car according to the present invention. The hybrid car 100 basically allows driving with the engine 61 over the entire driving region. Referring to FIG. 13, the axis of abscissa is the vehicle speed V (km/h) and the axis of ordinate is the torque instruction value $T_q$ (kgf·cm), and the driving region is divided into an engine region in which the engine 61 drives the car, an EV region in which the car is driven only with the generator-motor 43, an engine charging region in which the engine 61 is operated in a high efficiency region to drive the generator-motor 43 and generation energy generated by the generator-motor 43 is used to charge the batteries 21 while the car is running, a charging region and a regeneration region in which, when the car is decelerated, regeneration braking is applied by the generator-motor 43 to cause the generator-motor 43 to generate power to charge the batteries 21, an engine/motor region ① in which the car is driven with the engine 61 and the generator-motor 43, and another engine/motor region ② in which the car is driven with the engine 61 and the generator-motor 43 which is controlled by field-weakening control.

Figure 23:
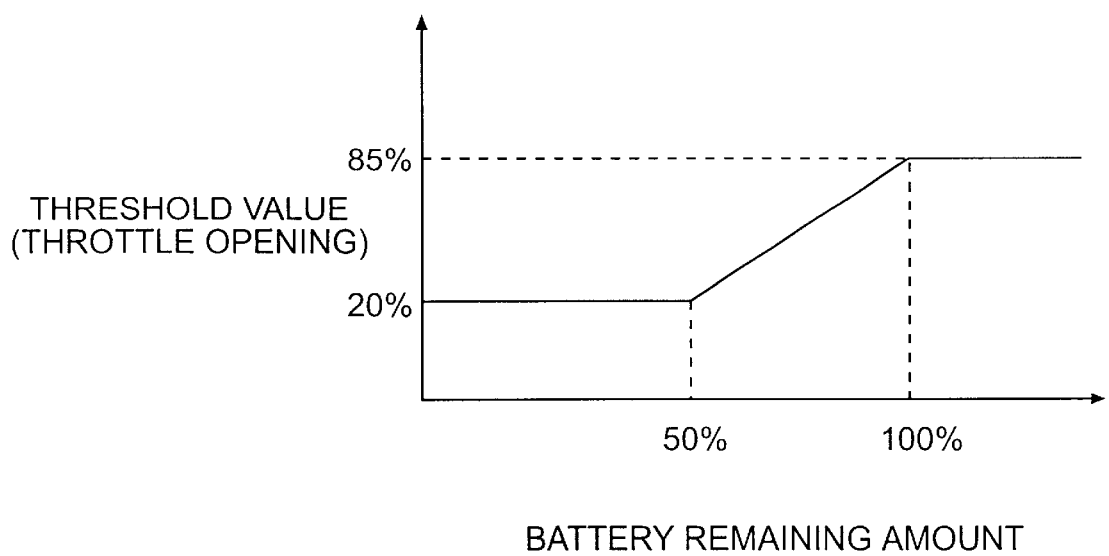
FIG. 23 is a characteristic diagram of a battery remaining amount and a throttle opening (accelerator opening) threshold value.
Figure 24:
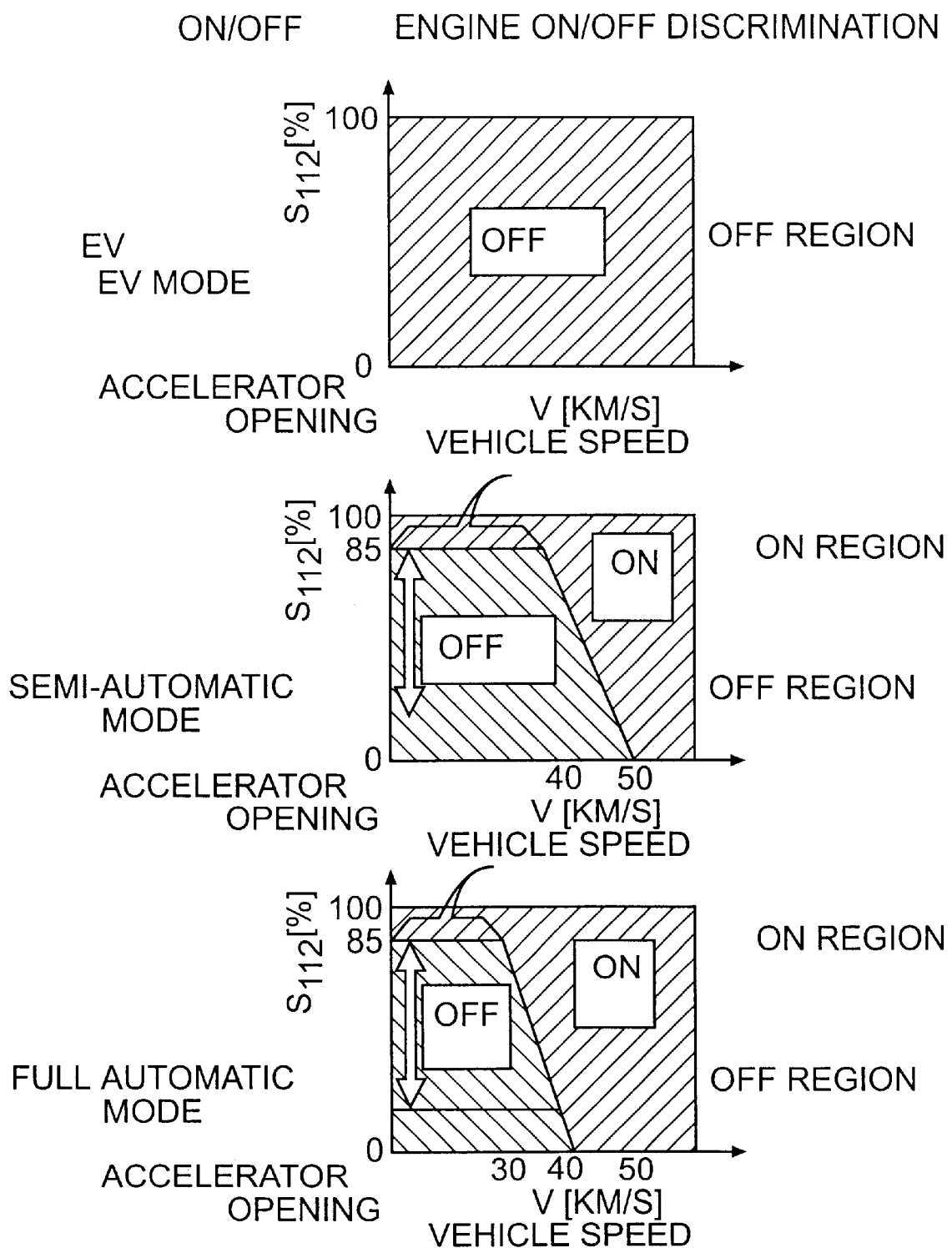
FIG. 24 is a diagram of ON/OFF discrimination of the engine.

It is to be noted that the boundary between the engine/motor ① region and the engine/motor region ② is corrected such that, as the voltage of the batteries 21 drops, the boundary between the engine/motor regions ① and ② moves as indicated by an arrow mark to a region of a broken line which is wider. It is to be noted that such a construction that the relationship between the battery remaining amount and the threshold value for the throttle opening (accelerator opening) is determined in such a manner as illustrated in FIG. 23 and ON/OFF discrimination of the engine is performed as shown in FIG. 24 may be employed. The relationship may be stored as a data table in a ROM in the control apparatus so that it may be referred to at any time.

Where the battery remaining amount is, for example, 0 to 50%, the threshold value is set, for example, to 20%. Where the battery remaining amount is, for example, higher than 100%, the threshold value is set, for example, to 85%. Where the battery remaining amount is, for example, 50 to 100%, the threshold value exhibits a gradual increase.

Figure 25:
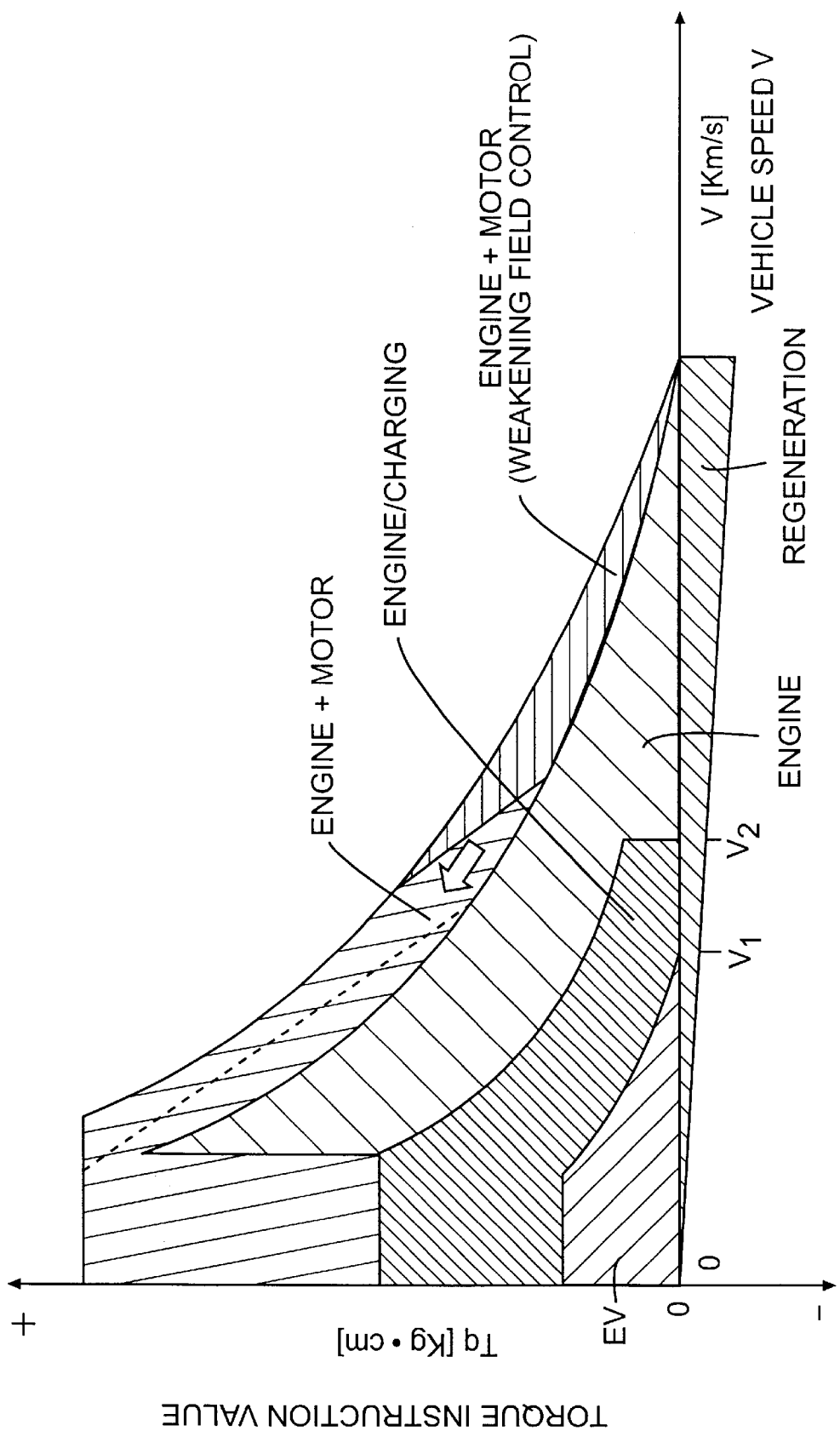
FIG. 25 is another diagram illustrating driving regions of the engine and the motor of the hybrid car.

In the semi-automatic mode and the full automatic mode of FIG. 24, the threshold value for accelerator opening at which operation of the engine is started is made variable within 20 to 85% based on the battery remaining amount. Accordingly, as the battery remaining amount becomes small, engine driving is performed at an early stage from a condition wherein the accelerator opening is low. Consequently, as shown in FIG. 25, the EV region becomes smaller compared with that of the case of FIG. 13, and the engine/charging region can be widened as much. In this instance, in the semi-automatic mode, V1=50 km/s, and in the full automatic mode, V1=40 km/s. Consequently, when the battery remaining amount is small, engine/charging can be performed frequently, and consumption of (the power of) the batteries can be prevented effectively.

The present invention exhibits the following benefits due to the construction described above. First, since the motor controlling apparatus for the hybrid car as set forth in the present invention is constructed such that it comprises current feedback control means for controlling a generator-motor so that a motor current of the generator-motor may be equal to an aimed current set based on the torque instruction value, torque feedback control means for controlling the generator-motor so that a driving wheel torque which is a torque of a driving wheel detected by a torque sensor unit may be equal to the torque instruction value, and motor control means for selecting one of an output from the current feedback control means and an output from the torque feedback control means based on an output from a motor revolution number sensor which detects a number of revolutions of the generator-motor and controlling the generator-motor based on the selected one output and, when the generator-motor motor rotates at a low speed, current feedback control by which the motor current can be controlled with a high degree of accuracy can be performed to protect the generator-motor from over-current, but in a high vehicle speed-high torque region, torque feedback control can be performed to effect control of the generator-motor including also the driving torque of the engines the fuel consumption efficiency can be raised.

Second, since the motor controlling apparatus for the hybrid car of the present invention is constructed such that the current feedback control means includes aimed current setting means for setting the aimed current based on the torque instruction value, motor current detection means for detecting the motor current of the generator-motor, selection comparison means for outputting a reset pulse when an output value of the motor current detection means is higher than an output value of the aimed current setting means, and oscillation means for resetting an oscillation output to zero in response to the reset pulse and, when the generator-motor rotates at a low speed, current feedback control by which the motor current can be controlled with a high degree of accuracy can be performed to protect the generator-motor from over-current, appropriate use of the generator-motor confirming to required torque is allowed and reduction in cost can be achieved.

Third, since the motor controlling apparatus for a hybrid car as set forth in the present invention is constructed such that the torque feedback means includes deviation calculation means for calculating a deviation between the torque instruction value and the torque of the driving wheel, and proportional plus integral plus derivative control means for performing proportional plus integral plus derivative compensation for an output of the deviation calculation means and, in a high vehicle speed-high torque region, torque feedback control can be performed to effect control of the generator-motor including also the driving torque of the engine, the fuel consumption efficiency of the engine can be raised.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor controlling apparatus for a vehicle comprising:
    a generator-motor for alternatively providing power to a driven wheel of the vehicle or generating power for use by the vehicle from revolutions of the driven wheel of the vehicle;
    an accelerator opening sensor for generating an accelerator opening signal indicative of a desired acceleration level;
    a vehicle speed sensor for generating a vehicle speed signal indiciative of the speed of the vehicle;
    an aimed driving wheel output power setting means for setting a torque instruction value based on said accelerator opening signal and said vehicle speed signal;
    a current feedback control means for controlling said generator-motor so that a motor current of said generator-motor equals an aimed current set based on said torque instruction value;
    a torque sensor for sensing a driving wheel torque of the driven wheel;
    a torque feedback control means for controlling said generator-motor so that said driving wheel torque equals said torque instruction value;
    a motor revolution number sensor for detecting a number of revolutions of said generator-motor and for outputting a revolution number signal; and
    a motor control means for receiving said revolution number signal and for selecting either said current feedback control means or said torque feedback control means to control said generator-motor based upon said revolution number signal, wherein said torque feedback means includes:
        a deviation calculation means for calculating a deviation between said torque instruction value and said driving wheel torque sensed by said torque sensor; and
        a proportional plus integral plus derivative control means for performing proportional plus integral plus derivative condensation for an output of said deviation calculation means.

2. The motor controlling apparatus according to claim 1, wherein said current feedback control means includes:
    an aimed current setting means for setting said aimed current based on said torque instruction value;
    a motor current detection means for detecting said motor current of said generator-motor;
    a selection comparison means for outputting a reset pulse when a value of said motor current detected by said motor current detection means is higher than a value of said aimed current set by said aimed current setting means; and
    an oscillation means for resetting an oscillation output to zero in response to said reset pulse.

3. The motor controlling apparatus according to claim 1, further comprising at least one battery to be disposed in the vehicle and connected to said generator-motor.

4. The motor controlling apparatus according to claim 3, wherein the power, generated by said generator-motor for use by the vehicle from revolutions of the driven wheel of the vehicle, recharges said at least one battery.

5. The motor controlling apparatus according to claim 4, wherein said at least one battery is a plurality of batteries.

6. The motor controlling apparatus according to claim 1, wherein the vehicle is a hybrid vehicle having a gas engine and said generator-motor for powering the vehicle.

7. A motor controlling apparatus for a hybrid vehicle having a gas engine and a generator-motor for powering the vehicle, said motor controlling apparatus comprising:
    a generator-motor for alternatively providing power to a driven wheel of the vehicle or generating power for use by the vehicle from revolutions of the driven wheel of the vehicle;
    an accelerator opening sensor for generating an accelerator opening signal indicative of a desired acceleration level;
    a vehicle speed sensor for generating a vehicle speed signal indiciative of the speed of the vehicle;
    an aimed driving wheel output power setting means for setting a torque instruction value based on said accelerator opening signal and said vehicle speed signal;
    a current feedback control means for controlling said generator-motor so that a motor current of said generator-motor equals an aimed current set based on said torque instruction value;
    a torque sensor for sensing a driving wheel torque of the driven wheel;
    a torque feedback control means for controlling said generator-motor so that said driving wheel torque equals said torque instruction value;
    a motor revolution number sensor for detecting a number of revolutions of said generator-motor and for outputting a revolution number signal; and
    a motor control means for receiving said revolution number signal and for selecting either said current feedback control means or said torque feedback control means to control said generator-motor based upon said revolution number signal, wherein said current feedback control means includes:
        an aimed current setting means for setting said aimed current based on said torque instruction value;
        a motor current detection means for detecting said motor current of said generator-motor;

a selection comparison means for outputting a reset pulse when a value of said motor current detected by said motor current detection means is higher than a value of said aimed current set by said aimed current setting means; and an oscillation means for resetting an oscillation output to zero in response to said reset pulse, and wherein said torque feedback means includes:

a deviation calculation means for calculating a deviation between said torque instruction value and said driving wheel torque sensed by said torque sensor; and a proportional plus integral plus derivative control means for performing proportional plus integral plus derivative compensation for an output of said deviation calculation means.

8. The motor controlling apparatus according to claim 7, further comprising at least one battery to be disposed in the vehicle and connected to said generator-motor.

9. The motor controlling apparatus according to claim 8, wherein the power, generated by said generator-motor for use by the vehicle from revolutions of the driven wheel of the vehicle, recharges said at least one battery.

10. The motor controlling apparatus according to claim 9, wherein said at least one battery is a plurality of batteries.

11. A motor controlling apparatus for a vehicle comprising:

a generator-motor for alternatively providing power to a driven wheel of the vehicle or generating power for use by the vehicle from revolutions of the driven wheel of the vehicle;

an accelerator opening sensor for generating an accelerator opening signal indicative of a desired acceleration level;

a vehicle speed sensor for generating a vehicle speed signal indiciative of the speed of the vehicle;

an aimed driving wheel output power setting means for setting a torque instruction value based on said accelerator opening signal and said vehicle speed signal;

a current feedback control means for controlling said generator-motor so that a motor current of said generator-motor equals an aimed current set based on said torque instruction value;

a torque sensor for sensing a driving wheel torque of the driven wheel;

a torque feedback control means for controlling said generator-motor so that said driving wheel torque equals said torque instruction value;

a motor revolution number sensor for detecting a number of revolutions of said generator-motor and for outputting a revolution number signal; and a motor control means for receiving said revolution number signal and for selecting either said current feedback control means or said torque feedback control means to control said generator-motor based upon said revolution number signal;

wherein said motor control means selects said torque feedback control means to control said generator-motor when said revolution number signal is indicative of a high speed region of said generator-motor, and wherein said motor control means selects said current feedback control means to control said generator-motor when said revolution number signal is indicative of a low speed region of said generator-motor.

12. The motor controlling apparatus according to claim 11, wherein said torque feedback means includes:

a deviation calculation means for calculating a deviation between said torque instruction value and said driving wheel torque sensed by said torque sensor; and a proportional plus integral plus derivative control means for performing proportional plus integral plus derivative compensation for an output of said deviation calculation means.

13. The motor controlling apparatus according to claim 11, wherein said current feedback control means includes:

an aimed current setting means for setting said aimed current based on said torque instruction value;

a motor current detection means for detecting said motor current of said generator-motor;

a selection comparison means for outputting a reset pulse when a value of said motor current detected by said motor current detection means is higher than a value of said aimed current set by said aimed current setting means; and an oscillation means for resetting an oscillation output to zero in response to said reset pulse.

14. The motor controlling apparatus according to claim 13, wherein said torque feedback means includes:

a deviation calculation means for calculating a deviation between said torque instruction value and said driving wheel torque sensed by said torque sensor; and a proportional plus integral plus derivative control means for performing proportional plus integral plus derivative compensation for an output of said deviation calculation means.

15. The motor controlling apparatus according to claim 11, further comprising at least one battery to be disposed in the vehicle and connected to said generator-motor.

16. The motor controlling apparatus according to claim 15, wherein the power, generated by said generator-motor for use by the vehicle from revolutions of the driven wheel of the vehicle, recharges said at least one battery.

17. The motor controlling apparatus according to claim 16, wherein said at least one battery is a plurality of batteries.

18. The motor controlling apparatus according to claim 11, wherein the vehicle is a hybrid vehicle having a gas engine and said generator-motor for powering the vehicle.

* * * * *